(12) United States Patent
Ueda et al.

(10) Patent No.: US 9,398,330 B2
(45) Date of Patent: Jul. 19, 2016

(54) INFORMATION PROCESSING DEVICE, INFORMATION RECORDING MEDIUM, INFORMATION PROCESSING METHOD, AND PROGRAM

(71) Applicants: Sony Corporation, Tokyo (JP); Sony Pictures Entertainment Inc., Culver City, CA (US)

(72) Inventors: Kenjiro Ueda, Kanagawa (JP); Tateo Oishi, Saitama (JP); Yoshikazu Takashima, Los Angeles, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 47 days.

(21) Appl. No.: 14/573,709

(22) Filed: Dec. 17, 2014

(65) Prior Publication Data

US 2016/0057491 A1 Feb. 25, 2016

Related U.S. Application Data

(60) Provisional application No. 62/040,445, filed on Aug. 22, 2014.

(51) Int. Cl.
*G06F 11/30* (2006.01)
*G06F 12/14* (2006.01)
(Continued)

(52) U.S. Cl.
CPC ........ *H04N 21/440218* (2013.01); *G06F 21/10* (2013.01); *H04N 21/2347* (2013.01); *H04N 21/234309* (2013.01); *H04N 21/4405* (2013.01); *G06F 2221/0724* (2013.01)

(58) Field of Classification Search
CPC .......... H04N 21/440218; H04N 21/2347; G06F 21/10; G06F 21/4405
USPC .......... 713/155–159, 160–167, 189–193; 709/229; 380/28–30, 44–47, 277–286
See application file for complete search history.

(56) References Cited

U.S. PATENT DOCUMENTS

2009/0010437 A1* 1/2009 Takashima ....... G11B 20/00086 380/277
2012/0254456 A1* 10/2012 Visharam .......... H04N 21/2343 709/231

FOREIGN PATENT DOCUMENTS

JP 2006-236508 A 9/2006
JP 2008-84445 A 4/2008
JP 2013-93755 A 5/2013

OTHER PUBLICATIONS

International Search Report issued Aug. 25, 2015 in PCT/JP2015/069567 (with English language translation).

*Primary Examiner* — Evans Desrosiers
(74) *Attorney, Agent, or Firm* — Oblon, McClelland, Maier & Neustadt, L.L.P.

(57) ABSTRACT

Provided is an information processing device including: a data processing unit that performs format conversion of converting MPEG-2 TS format data into MP4 format data, wherein the MPEG-2 TS format data is data that includes each segment region having a plurality of pieces of variation data decryptable with different keys, and wherein the data processing unit selects encrypted MP4 variation data from the segment region of the MPEG-2 TS format data and stores the MP4 variation data as MP4 format structure data in an MP4 file, while the encrypted variation data remains, without performing a decryption process and a re-encryption process for the selected MP4 variation data.

12 Claims, 20 Drawing Sheets

(51) Int. Cl.
*H04N 21/4402* (2011.01)
*G06F 21/10* (2013.01)
*H04N 21/2343* (2011.01)
*H04N 21/2347* (2011.01)
*H04N 21/4405* (2011.01)
*G06F 17/00* (2006.01)
*H04L 29/06* (2006.01)

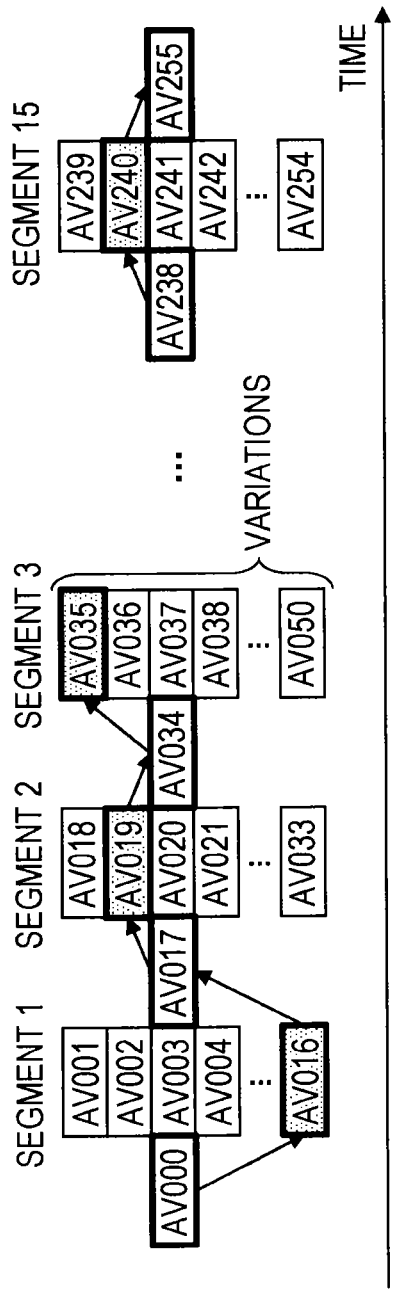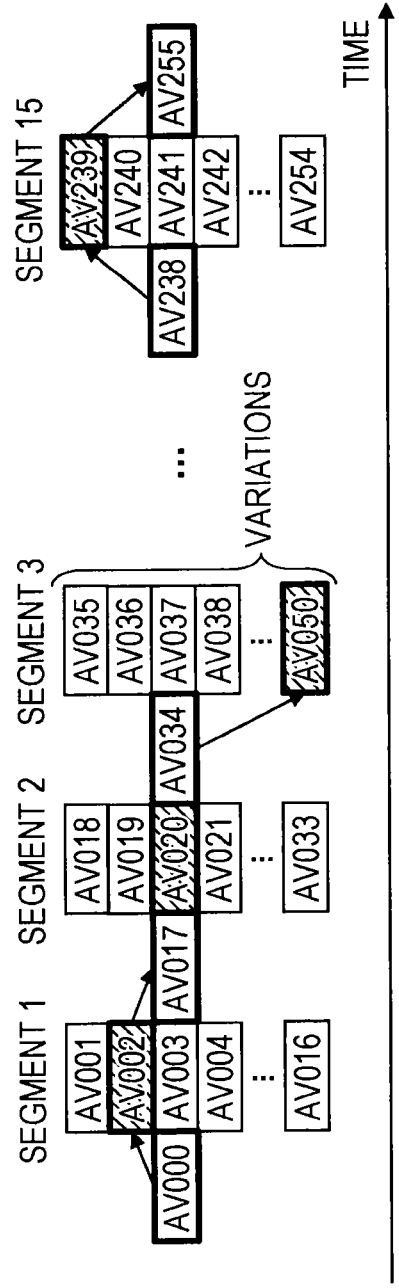

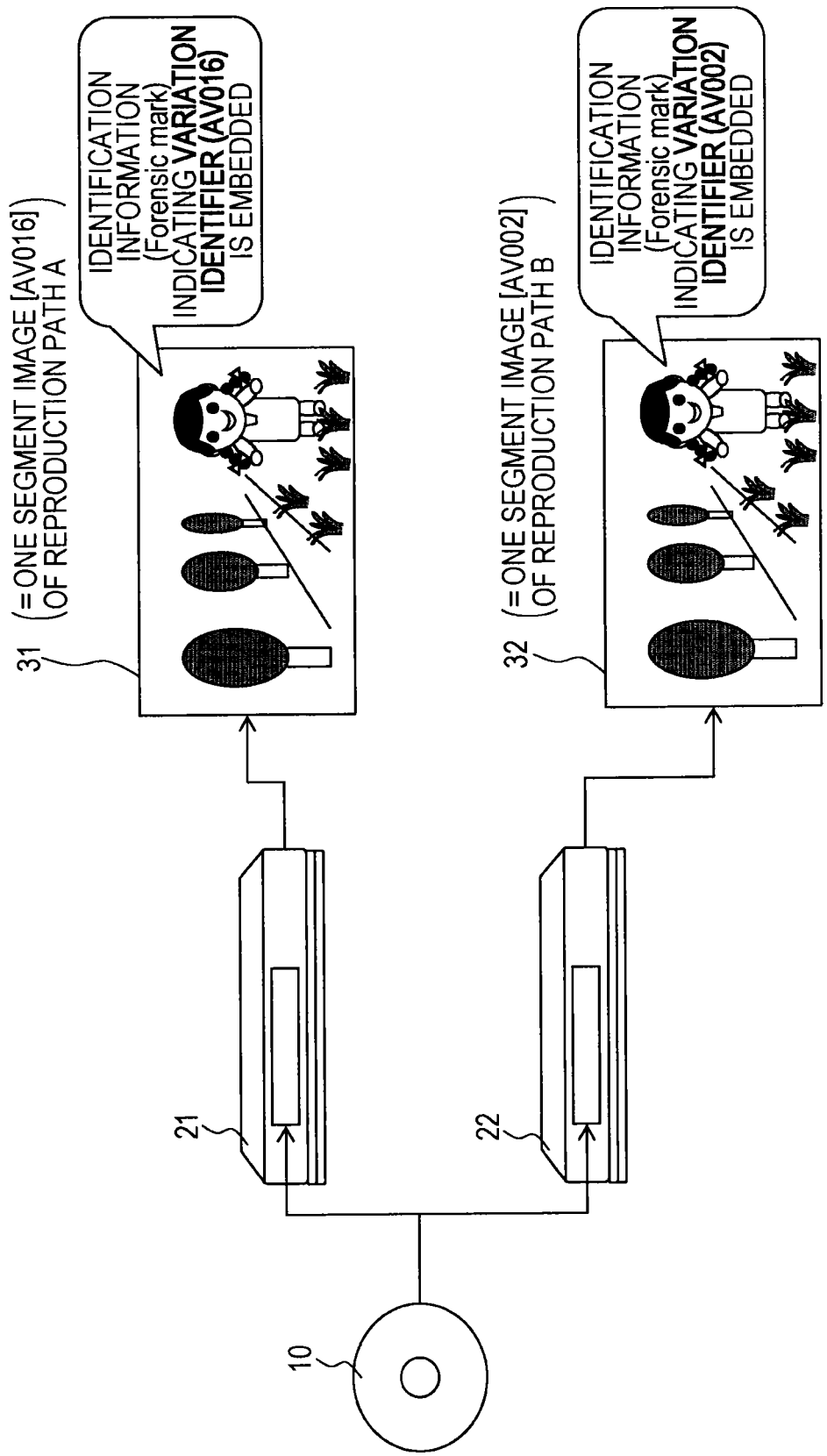

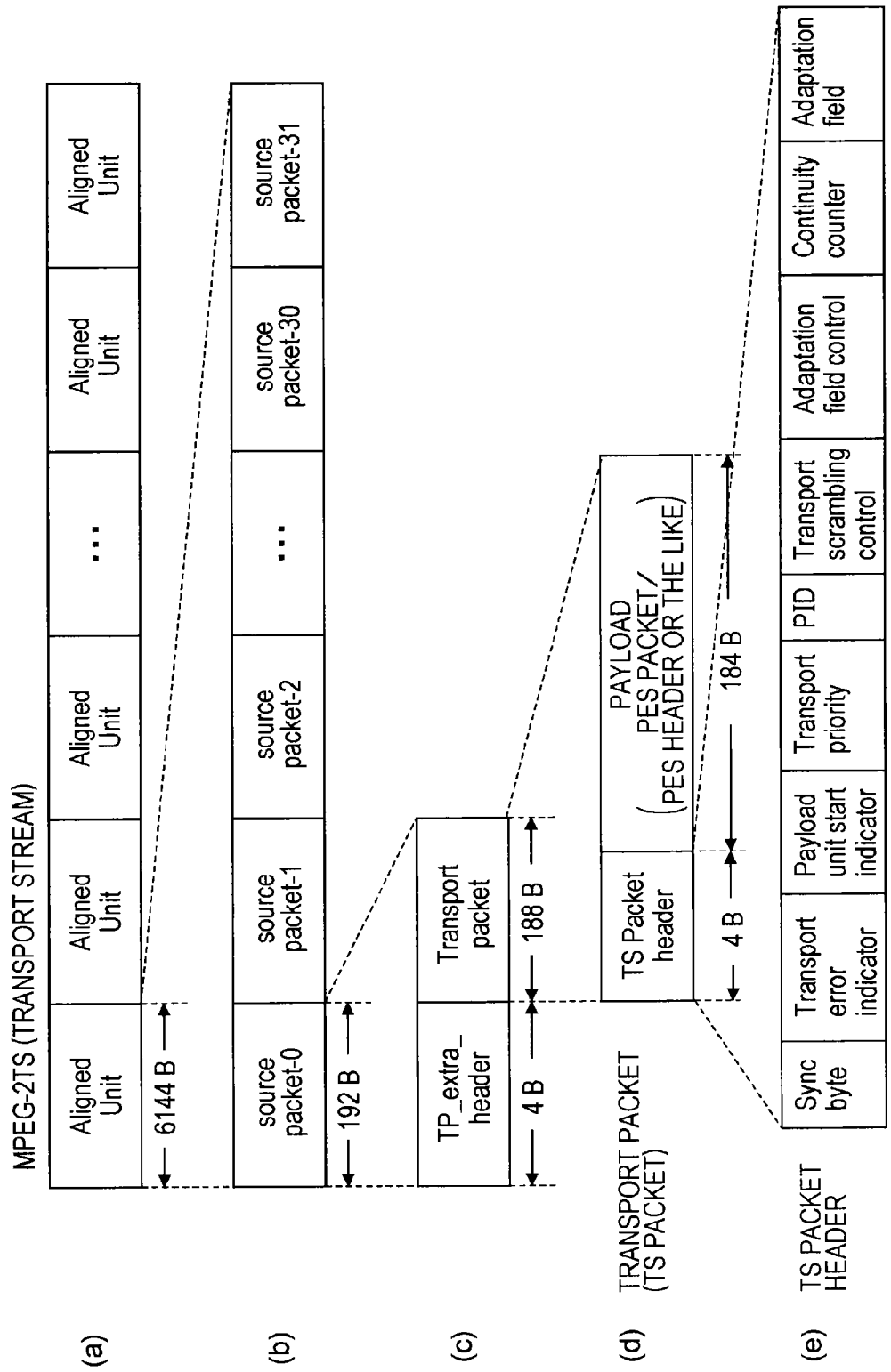

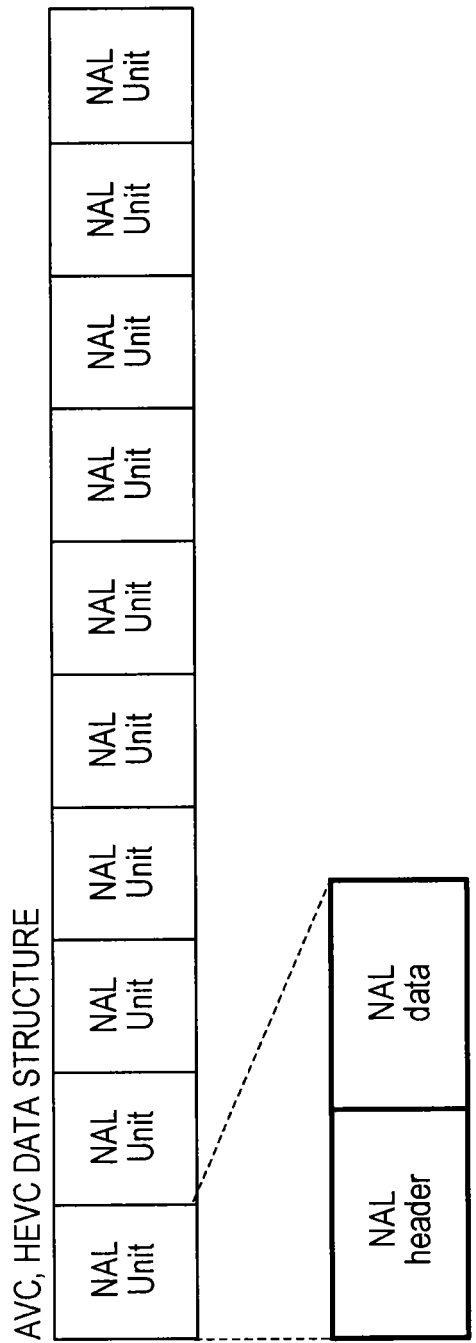

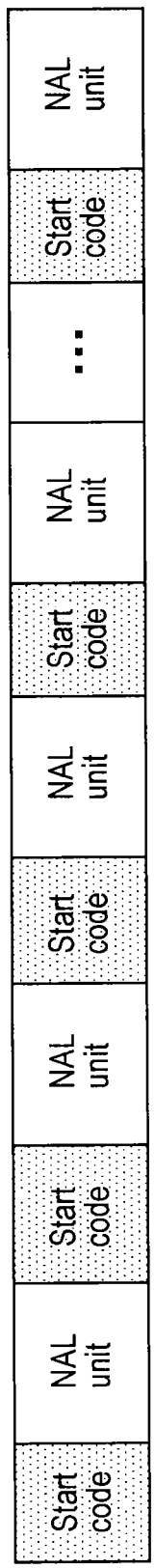
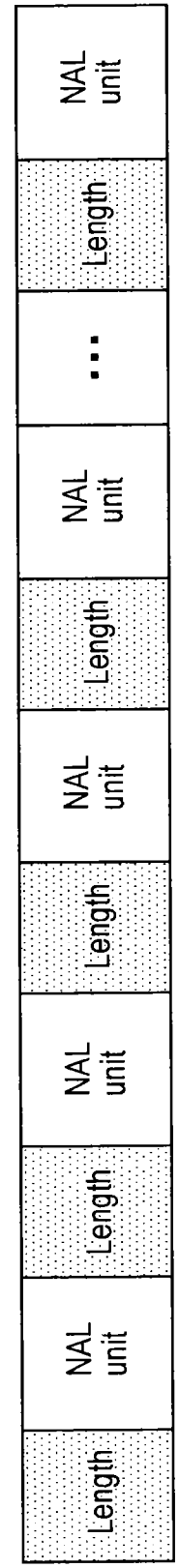
FIG. 9A
FIG. 9B

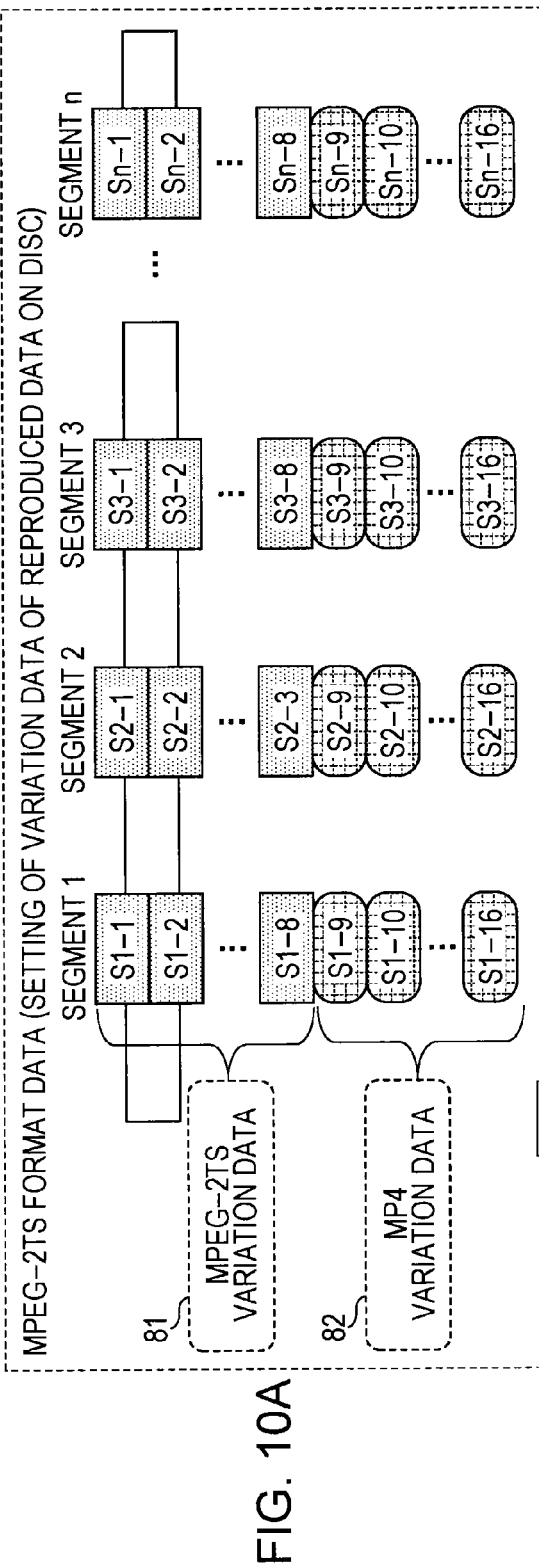
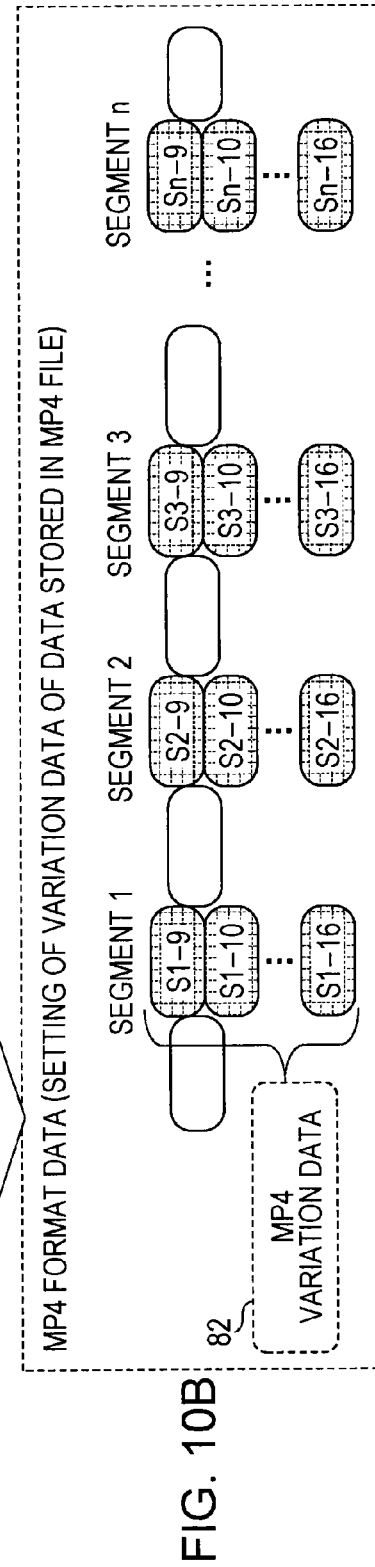
FIG. 10A
FIG. 10B

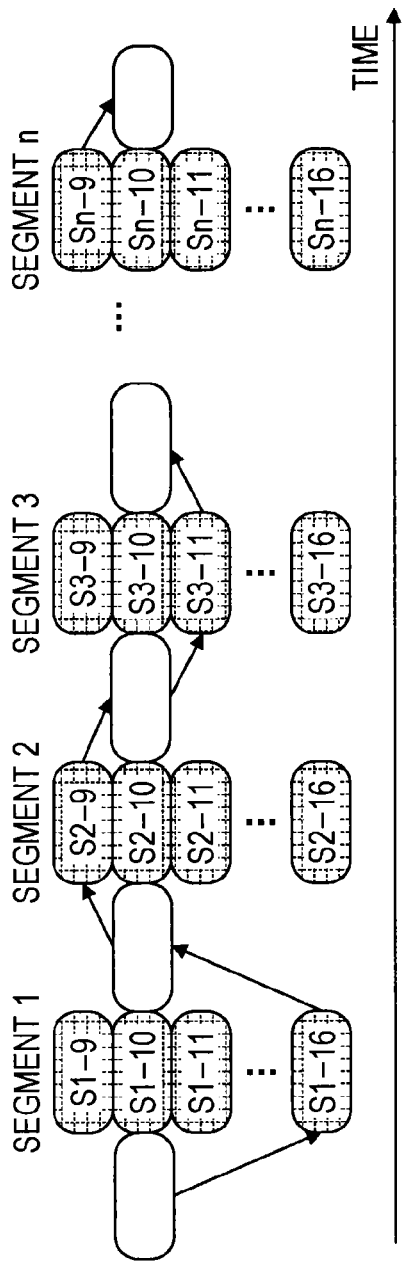
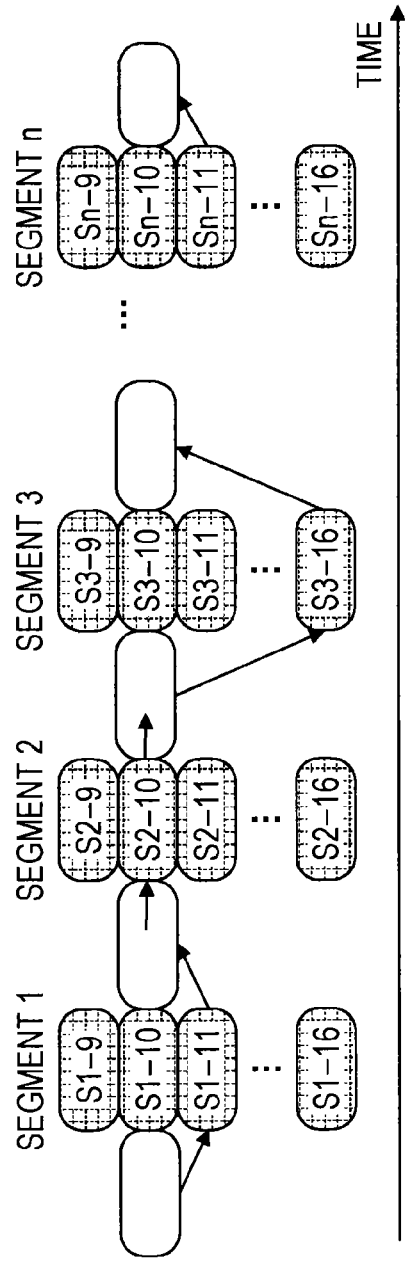
FIG. 11A
FIG. 11B

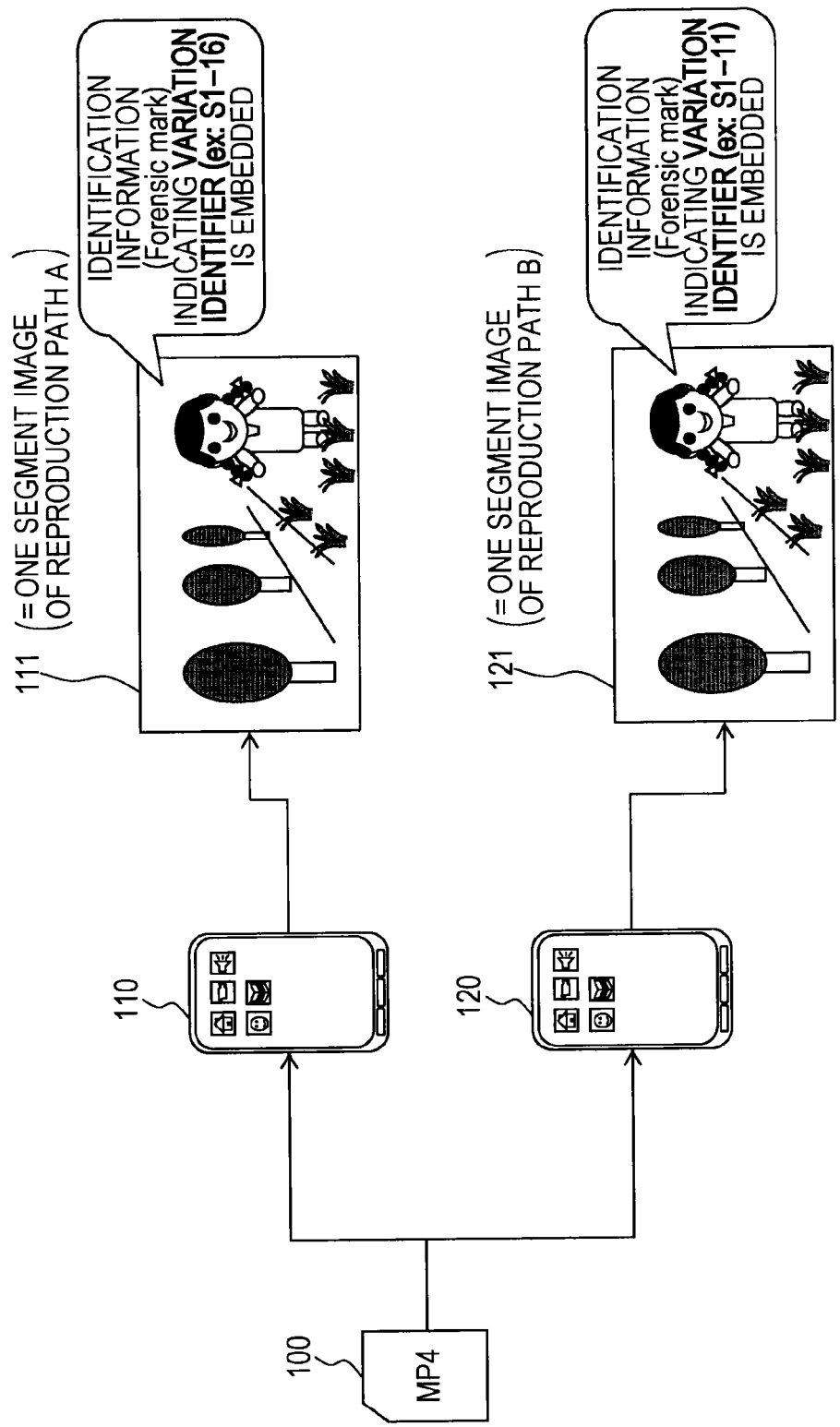

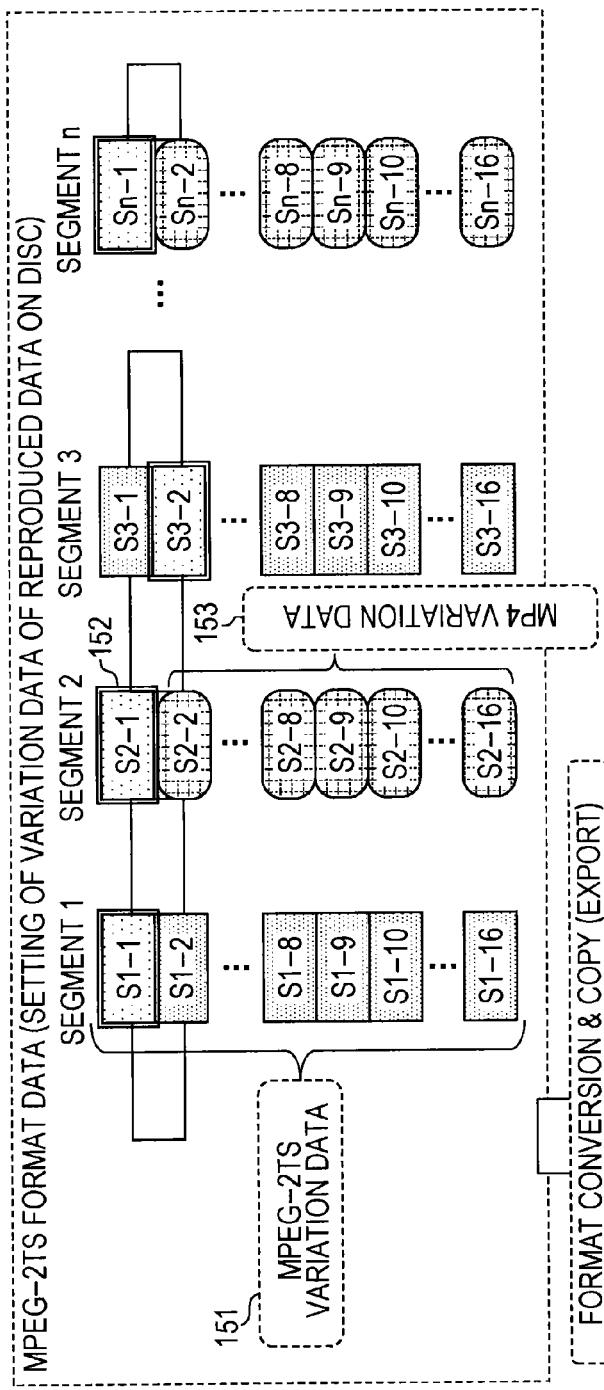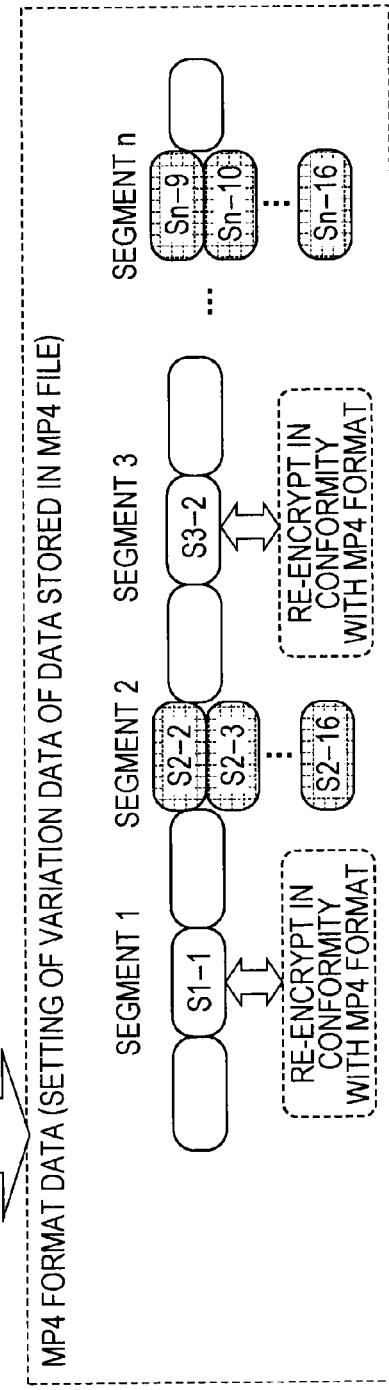

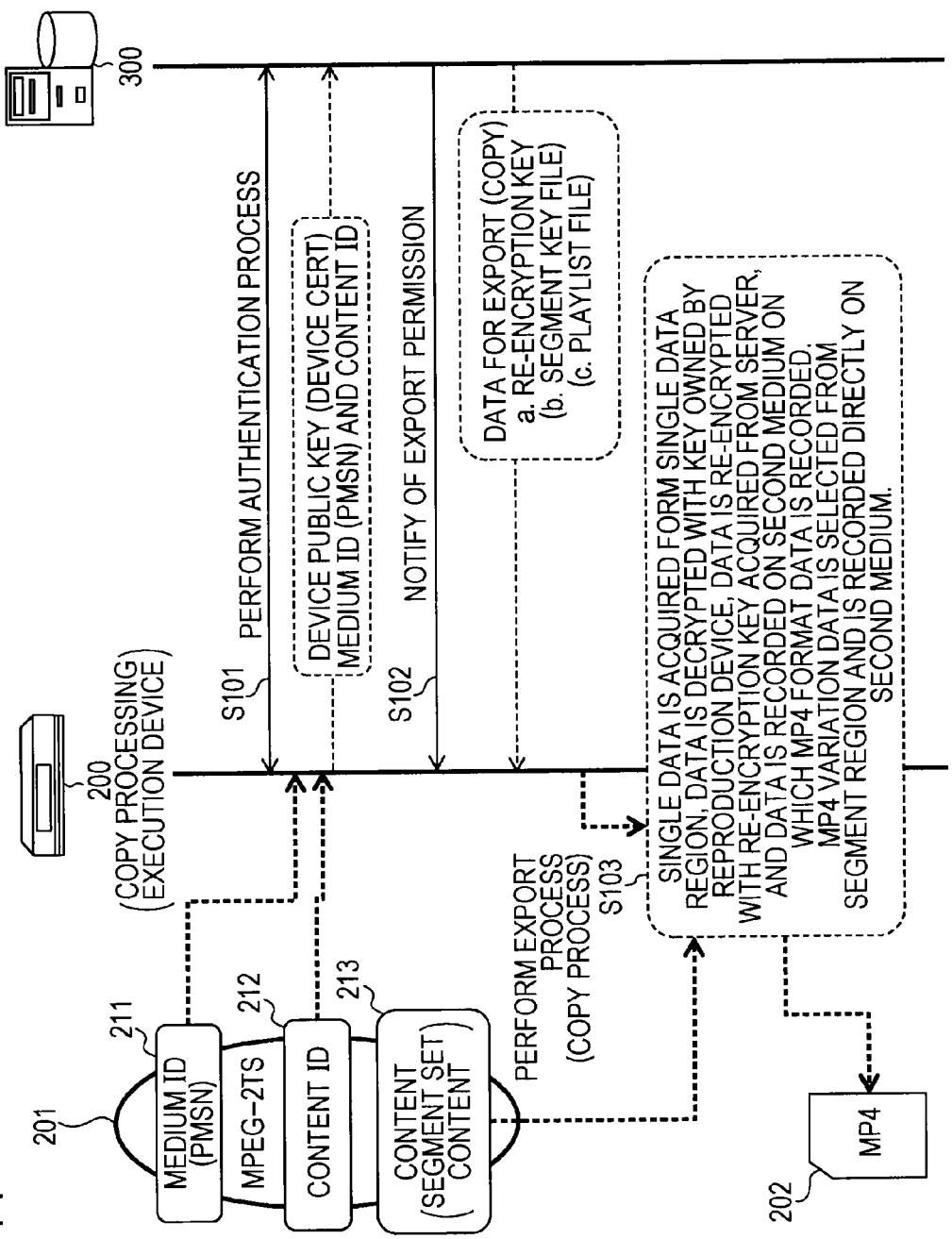

INFORMATION PROCESSING DEVICE, INFORMATION RECORDING MEDIUM, INFORMATION PROCESSING METHOD, AND PROGRAM

CROSS-REFERENCE TO RELATED APPLICATION

This application claims the benefit of priority of Provisional Application Ser. No. 62/040,445, filed Aug. 22, 2014, the entire contents of which is incorporated herein by reference.

BACKGROUND

The present disclosure relates to an information processing device, an information recording medium, an information processing method, and a program, and more particularly, to an information processing device, an information recording medium, an information processing method, and a program performing, for example, data recording involving format conversion.

As information recording media recording various kinds of content such as movies and music, DVDs (Digital Versatile Discs) or BDs (Blu-ray (registered trademark) Discs) have been considerably used.

In information recording media such as discs, images, audios, and various kinds of data such as reproduction control data are recorded with predefined data recording formats.

For example, the BDMY (Blu-ray (registered trademark) Disc Movie) format is used as a data recording format for BDs.

In order to reproduce recorded data with the BDMV format, it is necessary to retain a program for reproduction of BDMV format data.

The BDMV format data includes a clip AV stream file in which reproduction target data is recorded, a playlist file serving as a reproduction control information file, a clip information file.

Image or audio data which is the reproduction target data is stored in the clip AV stream file, but the clip AV stream file is recorded according to the MPEG-2 TS format including TS (Transport Stream) packets.

The copyrights, the distribution rights, or the like of many pieces of content such as music data and image data recorded in information recording media such as BDs are owned by generators or sellers. Accordingly, when the content is stored in such information recording media and supplied to users, use control is generally performed to permit only users who have regular use rights to use the content.

Specifically, for example, content is recorded as encrypted content and control is performed to allow the content to be decrypted with only encryption keys supplied to users legitimately purchasing the content. However, when such a process is performed but, for example, users acquiring the encrypted content illegally distribute or publicize the decrypted content or the encryption keys, unspecified peoples may illegally use the content. In particular, illegal publicization or delivery of data via networks occurs in many cases in recent years, and thus how to prevent such illegality is a big challenge.

As the encrypted structure of data corresponding to the BD described above, there is a structure in which a device performing a decryption process based on decrypted (plain text) content can be determined.

This structure is a structure in which a device analyzing decrypted content generated by decrypting encrypted content, e.g., decrypted image data, and performing a decrypting process based on identification data extracted from an image is determined.

For example, Japanese Unexamined Patent Application Publication No. 2007-43336 discloses a structure in which source tracking can be performed.

In the structure disclosed in Japanese Unexamined Patent Application Publication No. 2007-43336, a plurality of pieces of variation data are set in a segment which is content structure data, e.g., image data of one scene including movie content. The plurality of pieces of variation data set in a segment region are data which can each be decrypted with different keys.

Each reproduction device selects, decrypts, and reproduces one piece of decryptable data from the plurality of pieces of variation data by applying a key (segment key) which can be used by the reproduction device and corresponds to a reproduction device.

That is, the different variation data is selected and reproduced according to the reproduction device and reproduction is performed along a different reproduction path according to the reproduction device.

For example, when copy data of decrypted content is circulated via a network, a device having decrypted content can be specified in a certain range by analyzing the variation data or the reproduction path included in the content.

Further, an encryption key (decryption key) stored in each reproduction device is different according to a maker or the like of the device, and thus a source can be tracked according to such a set unit.

On the other hand, in recent years, users who watch content such as movies with portable terminals such as smartphones or tablet terminals have increased.

Such portable terminals may not mount reproduction applications corresponding to the foregoing MPEG-2 TS format or the BDMV format.

Accordingly, when recorded data of BDs are copied to media of portable terminals, it is necessary to convert formats into formats which are not the BDMV format and with which the reproduction applications of the portable terminals can reproduce the recorded data and record the content.

A process of copying data between media is described in, for example, Japanese Unexamined Patent Application Publication No. 2008-98765 and Japanese Unexamined Patent Application Publication No. 2011-222078.

As a data recording format standardized in consideration of use by portable terminals, there is the MP4 format (hereinafter referred to as the MP4).

Many portable terminals have reproduction applications which can reproduce MP4 data recorded with the MP4 format. When content is recorded in media of the portable terminals, the content is necessary to be recorded with the MP4 format.

However, encryption modes permitted in the MPEG-2 TS format and the MP4 format, e.g., encryption algorithms or applicable key data structures, may not accord with each other. Accordingly, for example, when MPEG-2 TS format data including the variation data for which the above-described source tracking can be performed is converted into data with the MP4 format to be recorded, it is necessary to perform a process of decrypting the variation data recorded according to the MPEG-2 TS format once and re-encrypting the data to form data with an encrypted structure according to the MP4 format.

However, variation data which can decrypt a reproduction device is only one piece of variation data in the plurality of pieces of variation data set in one segment region.

Accordingly, a process of decrypting all of the pieces of variation data and re-encrypting the data may not be performed.

SUMMARY

It is desirable to provide an information processing device, an information recording medium, an information processing method, and a program capable of reproducing normal data after format conversion in a configuration in which, for example, a data recording process involving format conversion is performed.

According to an embodiment of the present disclosure, there is provided an information processing device including a data processing unit that performs format conversion of converting MPEG-2 TS format data into MP4 format data. The MPEG-2 TS format data is data that includes each segment region having a plurality of pieces of variation data decryptable with different keys. The data processing unit selects encrypted MP4 variation data from the segment region of the MPEG-2 TS format data and stores the MP4 variation data as MP4 format structure data in an MP4 file, while the encrypted variation data remains, without performing a decryption process and a re-encryption process for the selected MP4 variation data.

According to an another embodiment of the present disclosure, there is provided an information recording medium storing MPEG-2 TS format data. The MPEG-2 TS format data is data that includes each segment region having a plurality of pieces of variation data decryptable with different keys. The variation data set in the segment region includes MPEG-2 TS variation data and MP4 variation data. A conversion device reading the MPEG-2 TS format data recorded on the information recording medium and converting the MPEG-2 TS format data into the MP4 format data is able to store the MP4 variation data as MP4 format structure data in an MP4 file, while the encrypted variation data remains, without performing a decryption process and a re-encryption process for the MP4 variation data.

According to a still another embodiment of the present disclosure, there is provided an information processing device including a data processing unit that performs a process of reproducing MP4 format data and a communication unit that performs communication with a server. The MP4 format data is data which includes a segment region having a plurality of pieces of variation data decryptable with different keys and in which a plurality of reproduction paths is settable according to the variation data selected as reproduction targets. Each piece of variation data is data for which a variation data identifier is able to be analyzed from decrypted data. The communication unit receives reproduction path information permitted to be reproduced from the server. The data processing unit selects the variation data from the segment region according to the reproduction path information received from the server and performs content reproduction.

According to a still another embodiment of the present disclosure, there is provided an information processing method performed in an information processing device. The information processing device includes a data processing unit that performs format conversion of converting MPEG-2 TS format data into MP4 format data. The MPEG-2 TS format data is data that includes a segment region having a plurality of pieces of variation data decryptable with different keys. The data processing unit selects encrypted MP4 variation data from the segment region of the MPEG-2 TS format data and stores the MP4 variation data as MP4 format structure data in an MP4 file, while the encrypted variation data remains, without performing a decryption process and a re-encryption process for the selected MP4 variation data.

According to a still another embodiment of the present disclosure, there is provided an information processing method performed in an information processing device. The information processing device includes a data processing unit that performs a process of reproducing MP4 format data, and a communication unit that performs communication with a server. The MP4 format data is data which includes a segment region having a plurality of pieces of variation data decryptable with different keys and in which a plurality of reproduction paths is settable according to the variation data selected as reproduction targets. Each piece of variation data is data for which a variation data identifier is able to be analyzed from decrypted data. The data processing unit selects the variation data from the segment region according to the reproduction path information received from the server and performs content reproduction.

According to a still another embodiment of the present disclosure, there is provided a program causing an information processing device to perform information processing. The information processing device includes a data processing unit that performs format conversion of converting MPEG-2 TS format data into MP4 format data. The MPEG-2 TS format data is data that includes a segment region having a plurality of pieces of variation data decryptable with different keys. The program causes the data processing unit to perform a process of selecting encrypted MP4 variation data from the segment region of the MPEG-2 TS format data, and a process of storing the MP4 variation data as MP4 format structure data in an MP4 file, while the encrypted variation data remains, without performing a decryption process and a re-encryption process for the selected MP4 variation data.

According to a still another embodiment of the present disclosure, there is provided a program causing an information processing device to perform information processing. The information processing device includes a data processing unit that performs a process of reproducing MP4 format data, and a communication unit that performs communication with a server. The MP4 format data is data which includes a segment region having a plurality of pieces of variation data decryptable with different keys and in which a plurality of reproduction paths is settable according to the variation data selected as reproduction targets. Each piece of variation data is data for which a variation data identifier is able to be analyzed from decrypted data. The program causes the data processing unit to select the variation data from the segment region according to the reproduction path information received from the server and perform content reproduction.

The program according to the present disclosure is, for example, a program which can be supplied to an information processing device or a computer system capable of various program codes by a recording medium or a communication medium supplying the program in a computer-readable format. By supplying the program in a computer-readable format, a process according to the program is realized on the information processing device or the computer system.

The other feature or advantages of the present disclosure will be apparent in more detailed description of embodiments of the present disclosure or the appended drawings to be described below. In the present specification, a system is a logical set configuration of a plurality of devices and is not limited to a configuration in which the plurality of devices are located in the same casing.

According to the structure of an embodiment of the present disclosure, a structure is realized in which the MPEG-2 TS format data including the variation data is converted into the MP4 format data and the setting of the reproduction path or the source tracking enabled even in the converted MP4 data.

Specifically, a data processing unit is included which converts MPEG-2 TS format data, which includes segment regions including a plurality of pieces of variation data decryptable with different keys and in which a reproduction path can be set according to the selected variation data, into the MP4 format data. The data processing unit selects the encrypted MP4 variation data from the segment regions of the MPEG-2 TS format and stores the MP4 variation data in an MP4 file while the selected MP4 variation data remains as encrypted data.

In the structure, the MPEG-2 TS format data including the variation data can be converted into the MP4 format data and the setting of the reproduction path or the source tracking can be realized even for the converted MP4 data.

A decryption process and a re-encryption process are not necessary at the time of format conversion, and thus the processes become efficient and a probability of data leakage is reduced.

The advantageous effects described in the present specification are merely exemplary and are not limited, and additional advantageous effects may be obtained.

BRIEF DESCRIPTION OF THE DRAWINGS

FIGS. 1A and 1B are diagrams for describing an example of the structure of content in which a reproduction path corresponding to a reproduction device can be set;

FIG. 2 is a diagram for describing an example of identification information detection from structure data of content in which a reproduction path corresponding to the reproduction device can be set;

FIG. 5 is a diagram for describing an example of the structure of the MPEG-2 TS (Transport Stream) which is the data structure of a clip AV stream file;

FIGS. 8A and 8B are diagrams for describing the structure of AVC and HEVC encoded data;

FIGS. 9A and 9B are diagrams for describing a difference between the MPEG-2 TS and the MP4 format;

FIGS. 10A and 10B are diagrams for describing a setting example of variation data according to an embodiment of the present disclosure;

FIGS. 11A and 11B are diagrams for describing a setting example of a reproduction path in the MP4 format data generated according to a process of an embodiment of the present disclosure;

FIG. 12 is a diagram for describing a detection example of identification information from structure data of content in which a reproduction path corresponding to a reproduction device can be set;

FIGS. 13A and 13B are diagrams for describing a setting example of variation data according to an embodiment of the present disclosure;

FIG. 14 is a sequence diagram for describing a sequence of a data recording process involving format conversion according to an embodiment of the present disclosure;

DETAILED DESCRIPTION OF EMBODIMENTS

Figure 3:
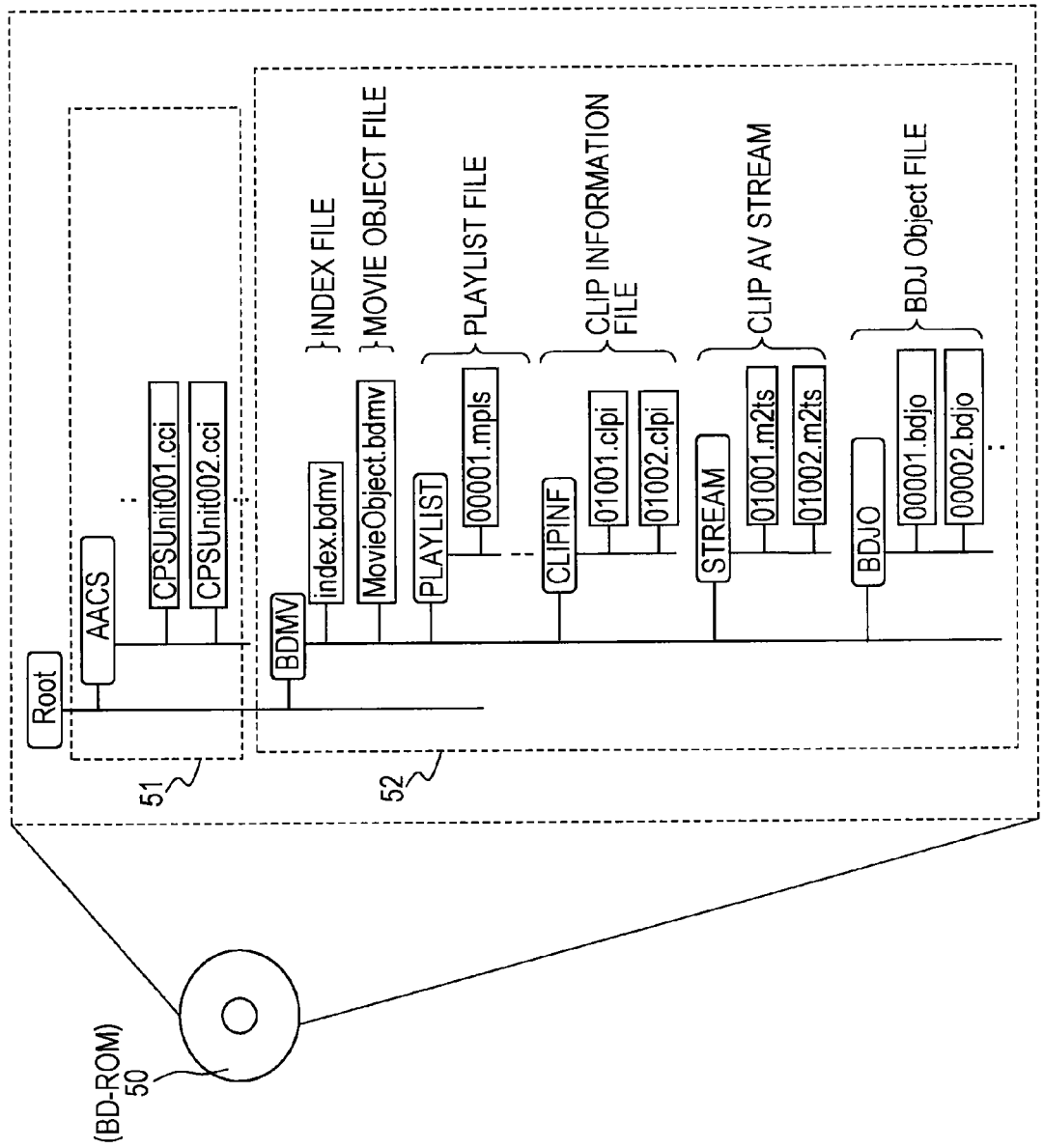
FIG. 3 is a diagram for describing an example of a directory structure of data recorded in media according to the BDMV format.

Hereinafter, the details of an information processing device, an information recording medium, an information processing method, and a program according to the present disclosure will be described with reference to the drawings. The description will be made in the following items.

1. Encryption Structure of MPEG-2 TS Format Data in Which Source Tracking Process Based on Reproduction Path Analysis Can Be Performed
2. MPET-2 TS Format and MP4 Format
2-1. MPEG-2 TS Format
2-2. MP4 Format
2-3. Process of Converting MPEG-2 TS into MP4
3. Setting of Variation Data Corresponding to Format Conversion
3-1. (First Embodiment) Embodiment in Which MPEG-2 TS Variation Data and MP4 Variation Data Are Set in Each Segment Region
3-2 (Second Embodiment) Embodiment in Which MP4 Variation Data Is Set in Only Some Segment Regions of Plurality of Segment Regions
4. Sequence of Data Recording Process and MP4 Format Data Reproduction Process Involving Format Conversion
4-1. Process Sequence in Embodiment in Which MPEG-2 TS Variation Data and MP4 Variation Data Are Set in Each Segment Region
4-2. Process Sequence in Embodiment in Which MP4 Variation Data Is Set in Only Some Segment Regions of Plurality of Segment Regions
5. Example of Configuration of Information Processing Device Performing Format Conversion and Data Recording Process
6. Example of Configurations of Information Processing Device and Server Performing Data Reproducing and Recording Processes
7. Conclusion of Configurations of the Present Disclosure

[1. Encryption Structure of MPEG-2 TS Format Data in Which Source Tracking Process Based on Reproduction Path Analysis Can Be Performed]

First, an encryption structure of MPEG-2 TS format data in which a source tracking process based on reproduction path analysis can be performed will be described.

FIGS. 1A and 1B are diagrams for describing a setting example of a reproduction path of content set according to a reproduction device reproducing input data of a BD (Blu-ray (registered trademark) Disc).

Reproduction target image or audio data recorded in the BD is recorded in conformity with the MPEG-2 TS format. The details of the MPEG-2 TS format will be described later.

In FIGS. 1A and 1B, each of the following diagrams is illustrated:

FIG. 1A: reproduction path A of a reproduction device A; and

FIG. 1B: reproduction path B of a reproduction device B.

AV000, AV001, AV002, etc. illustrated in the drawing are, for example, image data of a scene including movie content. The image data is, for example, image data including content formed by image frames for several seconds.

Along a time axis (time) illustrated from the left to the right of the drawing, the image data corresponding to sequentially reproduced scenes are illustrated.

For example, the first scene is AV000.

Sixteen pieces of image data (variation data) AV001 to AV016 are set as subsequent data of the first scene AV000.

The data is the same scene, but the sixteen image data AV001 to AV0016 are encrypted with different keys (segment keys).

Each reproduction device can select and reproduce one piece of data usable with a key stored in the self-reproduction device.

An image data section in which one piece of data can be selected and reproduced among the plurality of pieces of data is referred to as a segment or a segment region.

A section in which only one piece of data is prepared other than the segment region is referred to as a single data region. For example, only one piece of data is set in the reproduction section of AV000, AV017, or the like, and thus all of the reproduction devices reproduce only the one piece of data. Such a section is referred to as the single data region.

In the example illustrated in FIGS. 1A and 1B, sixteen segment regions (segment 1 to 16) are set in the content.

In each of the segments 1 to 16, data (=data decryptable with different keys) encrypted with sixteen different keys is set. Each of the plurality of pieces of data decryptable with the different keys set in the segment region is referred to as variation data.

A decryption key of the variation data is referred to as a segment key. The segment key is set as a different key according to each piece of variation data.

In the example illustrated in FIG. 1A, a reproduction path of the reproduction device A is illustrated.

The reproduction device A sequentially reproduces the following pieces of data:

AV000→[AV016]→AV017→[AV019]→AV034→ [AV036] . . . →AV238→[AV240]→AV255.

This path is the reproduction path A of the reproduction device A.

As in [AVxxx] in the foregoing reproduced data, data indicated by parenthesis of [ ] is the variation data set in each segment region.

The reproduction device A selects and reproduces data which can be decrypted by the reproduction device A from the sixteen pieces of variation data (encrypted data) set in the segment region.

Data not parenthesized by [ ] is data other than the segment region, i.e., data which is data of the single data region and data commonly reproduced by all of the reproduction devices.

On the other hand, the reproduction device B illustrated in FIG. 1B sequentially reproduces the following pieces of data:

AV000→[AV002]→AV017→[AV020]→AV034→ [AV050] . . . →AV238→[AV239]→AV255.

This path is the reproduction path B of the reproduction device B.

As in [AVxxx] of the foregoing reproduced data, data indicated by parenthesis of [ ] is the variation data. The reproduction device B selects and reproduces data which can be decrypted by the reproduction device B from the sixteen pieces of variation data (encrypted data) set in the segment region.

Data not parenthesized by [ ] is data other than the segment region and is data reproduced commonly by all of the reproduction devices.

When the reproduction path A of the reproduction device A is compared to the reproduction path B of the reproduction device B, the reproduced data in the single data region other than the segment region is common. However, the variation data reproduced in the segment region is different data.

An identifier indicating certain variation data in each reproduction path, i.e., variation data identifier such as [AVxxx], is embedded in the variation data set in the segment region in each reproduction path.

That is, by analyzing reproduced image data, it is possible to determine which variation data is reproduced.

The reproduced image data by each reproduction device and an image analysis process for the reproduced image data will be described with reference to FIG. 2.

The content including the segment regions and the single data region described with reference to FIGS. 1A and 1B is stored in an information recording medium (disc) 10 illustrated in FIG. 2.

A reproduction device A21 performs content reproduction along the reproduction path A described with reference to FIG. 1A.

A reproduction device B21 performs content reproduction along the reproduction path B described with reference to FIG. 1B.

A reproduced image A, 31 is the variation data selected from one segment region and is the variation data [AV016] included in the reproduction path A.

A reproduced image B, 32 is another variation data selected from the same segment region and is the variation data [AV002] included in the reproduction path B.

Both of the two reproduced images A and B are, for example, images of the same scene of movie content and are images which viewers watch without distinction.

The reproduced image A, 31 is the variation data [AV016] included in the reproduction path A and identification information (variation data identifier) indicating the variation data [AV016] is embedded in the reproduced image A, 31. For example, the identification information is embedded according to a technology such as digital watermark.

The identification information embedded in such reproduced data is referred to as a forensic mark or a forensic watermark.

The other reproduced image B, 32 is the variation data [AV002] included in the reproduction path B and identification information (variation data identifier) indicating the variation data [AV002] is embedded in the reproduced image B, 32.

In the content illustrated in FIGS. 1A and 1B, sixteen segment regions are set.

For example, in a case in which illegally circulated copy content is found from a network, a reproduction path of the content is revealed when it is determined which variation data reproduced images in the sixteen segment regions included in the illegally circulated content are.

For example, when illegally circulated copy content is the content formed from the reproduction path A illustrated in FIGS. 1A and 1B, the copy content can be determined in such a manner that the content decrypted by the reproduction device A illustrated in FIG. 2 is original data and the reproduction device A is a source of the illegal copy content.

For example, when illegally circulated copy content is the content formed from the reproduction path B illustrated in FIGS. 1A and 1B, the copy content can be determined in such a manner that the content decrypted by the reproduction device B illustrated in FIG. 2 is original data and the reproduction device B is a source of the illegal copy content.

[2. MPET-2 TS Format And MP4 Format]

A data encryption structure using the above-described variation data is an encryption structure which is applicable to data recorded in conformity with the MPEG-2 TS format.

As described above, in recent years, users who watch content such as movies with portable terminals such as smartphones or tablet terminals have increased.

Such portable terminals may not mount reproduction applications corresponding to the foregoing MPEG-2 TS format.

Many portable terminals have reproduction applications which can reproduce MP4 data recorded with the MP4 format. When content is recorded in media of the portable terminals, the content is necessary to be recorded with the MP4 format.

Hereinafter, an overview of the MPEG-2 TS format and the MP4 format will be described.

[2-1. MPEG-2 TS Format]

Both of the MPEG-2 TS format and the MP4 format are formats that define data storage formats (container formats) such as encoded data when encoded data which is content structure data such as images (videos), audio, and subtitles is stored in recording media or is transmitted through broadcast waves or a network.

The MPEG-2 TS format is a format standardized in ISO 13818-1 and is used for data recording on, for example, a BD (Blu-ray (registered trademark) disc) or digital broadcast.

On the other hand, the MP4 format is format defined in ISO/IECC 14496-14 and is a format suitable, for example, when data recording is performed on a flash memory or the like.

In recent years, many available portable terminals have reproduction applications which can reproduce MP4 data recorded with the MP4 format. When content is recorded in media of the portable terminals, the content is necessary to be recorded with the MP4 format in many cases.

The BDMV (Blue-ray (registered trademark) Disc Movie) format which is a data recording format on a BD, as described above, is a BD-dedicated format which includes encoded data such as images, audio, and the like stored in conformity with the MPEG-2 TS format as constituent elements.

The encoded data such as images, audio, and still images permitted to be stored in conformity with the MPEG-2 TS format are, for example, encoded data below:

images: MPEG-1, MPEG-2, AVC (MPEG-4 AVC), and HEVC (MPEG-4 HEVC);
audio: MP1, MP2, MP3, linear PCM, and DTS; and
still images: JPEG.

For example, the foregoing encoded data is each distributed and stored in TS (Transport Stream) packets defined in MPEG-2 TS.

First, the MPEG-2 TS format used for a BD or broadcast will be described with reference to FIG. 3 and the subsequent drawings.

FIG. 3 is a diagram illustrating a directory of recorded data recorded in a medium 50, which is, for example, a ROM-type BD (Blu-ray (registered trademark) Disc), in conformity with the BDMV format.

The directory is divided into a management information set portion 51 (AACS directory) and a data portion 52 (BDMV directory), as illustrated in FIG. 3.

In the management information set portion 51 (AACS directory), a CPS unit key file, a use control information file, or the like which is an encryption key of data is stored.

On the other hand, under the BDMV directory of the data portion 52, for example, the following files are recorded:
an index file;
a playlist file;
a clip information file;
a clip AV stream file; and
a BDJO file.

In the index file, title information is stored as index information applied to a reproduction process.

The playlist file is a file that defines a reproduction order or the like of content designated by a title according to program information of a production program and includes designation information for clip information having reproduction position information.

The clip information file is a file designated by the playlist file and has reproduction position information or the like of a clip AV stream file.

The clip AV stream file is a file that stores reproduction target AV stream data.

The BDJO file is a file that stores execution control information of a file storing a JAVA (registered trademark) program, a command, and the like.

A sequence of reproduction of content recorded in an information recording medium by an information processing device is as follows:
(a) a specific title is first designated from an index file by a reproduction application;
(b) a reproduction program associated with the designated title is selected;
(c) a playlist defining a reproduction order and the like of content according to program information of the selected reproduction program is selected; and
(d) an AV stream which is actual data of the content or a command is read according to clip information defined in the selected playlist and an AV stream reproduction process or a command execution process is performed.

Figure 4:
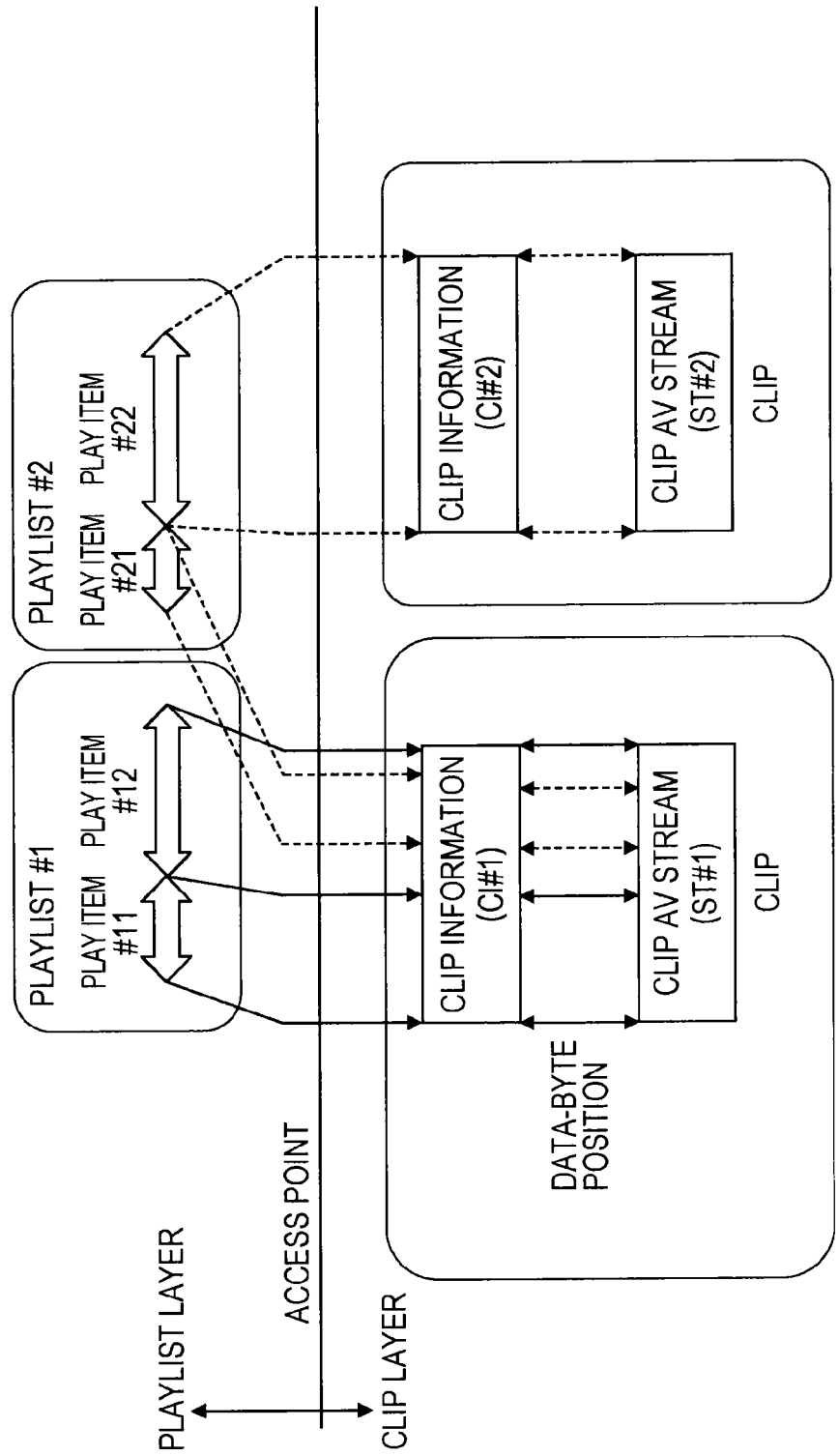
FIG. 4 is a diagram for describing correspondence between a playlist and reproduction data defined in the BDMV format.

FIG. 4 is a diagram for describing a correspondent relation between the following data recorded on the medium 50, i.e., the following data:
a playlist file;
a clip information file; and
a clip AV stream file.

An AV stream formed from image and audio data which is actual reproduction target data is recorded as a clip AV stream file, and a playlist file and a clip information file are defined as management information of the AV stream and a reproduction control information file.

As illustrated in FIG. 4, the file with the plurality of categories can be divided into two layers:
a playlist layer including playlist files; and
a clip layer including a clip AV stream file and a clip information file.

One piece of clip information matches one clip AV stream file, a pair of the clip information and the clip AV stream is considered as one object, and the clip information and the clip AV stream are collectively referred to as a clip.

Detailed information of data included in the clip AV stream file, e.g., management information such as an EP map in which I picture position information or the like of MPEG data is recorded, is recorded in the clip information file.

The clip AV stream file stores data in which an MPEG-2 TS (Transport Stream) is disposed according to a definition structure of the BDMV format. The details of this structure will be described later with reference to FIG. 5.

The clip information file stores, for example, management information used to acquire a reproduction start position or the like of input data of the clip AV stream file, such as correspondent data between a data position of byte string data of the clip AV stream file and a reproduction start position or the like such as a reproduction start point (entry point: EP) at the time of development on a time axis.

For example, when a time stamp indicating a reproduction time lapse position from a start point of content is supplied, a data reading position of the clip AV stream file, i.e., an address serving as a reproduction start point, can be acquired with reference to the clip information file.

The playlist file has designation information of a reproduction section corresponding to reproducible data included in the clip (=clip information file+clip AV stream file) layer.

One or more play items (PlayItem) is set in the playlist file and each of the play items includes designation information of a reproduction section corresponding to reproducible data included in the clip (=clip information file+clip AV stream file) layer.

The clip AV stream file that stores actual data of a reproduction target image or audio has, for example, an MPEG-2 transport stream (TS) file structure illustrated in FIG. 5.

As illustrated in FIG. 5, the MPEG-2 TS format has the following characteristics.

1) An MPEG-2 TS file includes an integer number of aligned units (Aligned unit).
2) The size of the aligned unit is 6 kB (=6144 bytes (2048×3 bytes)).
3) The aligned unit starts from the first byte of a source packet.
4) The source packet is 192 bytes long. One source packet is formed by TP_extra_header and a TS packet. TP_extra_header is 4 bytes long. The TS packet is 188 bytes long.
5) The TS packet has a header (TP header) and a payload portion. In the payload of one TS packet, encoded data which is one type of data such as an image or audio is stored.
6) In the header (TP header) of the TS packet, PID (program ID) indicating a type of data of the payload is recorded.
7) The payload of the TS packet includes a packet (packetized elementary stream (PES)) storing an elementary stream (ES), which is encoded data such as an image or audio, and a PES header.
8) In the PES header, a presentation time stamp (PTS) indicating reproduction time information of the elementary stream (ES) stored in a subsequent PES packet is recorded.

As illustrated in (E) of FIG. 5, the following data is each stored in the header information of the TS packet:
(a) synchronization byte (Sync byte);
(b) transport error identifier (Transport_error_indicator);
(c) payload unit start identifier (Payload_unit_start_indicator);
(d) transport priority (Transport_priority);
(e) program ID (PID);
(f) transport scrambling control (Transport scrambling control);
(g) adaption field control (Adaptation field control);
(h) continuity counter (Continuity counter); and
(i) Adaptation field (Adaptation field).

[2-2. MP4 Format]

Next, an overview of the MP4 format will be described with reference to FIGS. 6 and 7.

Figure 6B:
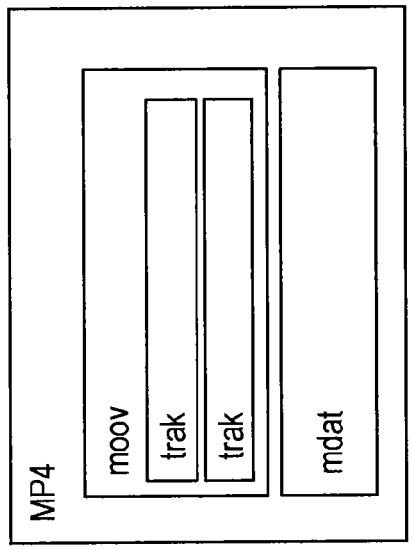
FIGS. 6A and 6B are diagrams for describing the MP4 format.
Figure 6A:
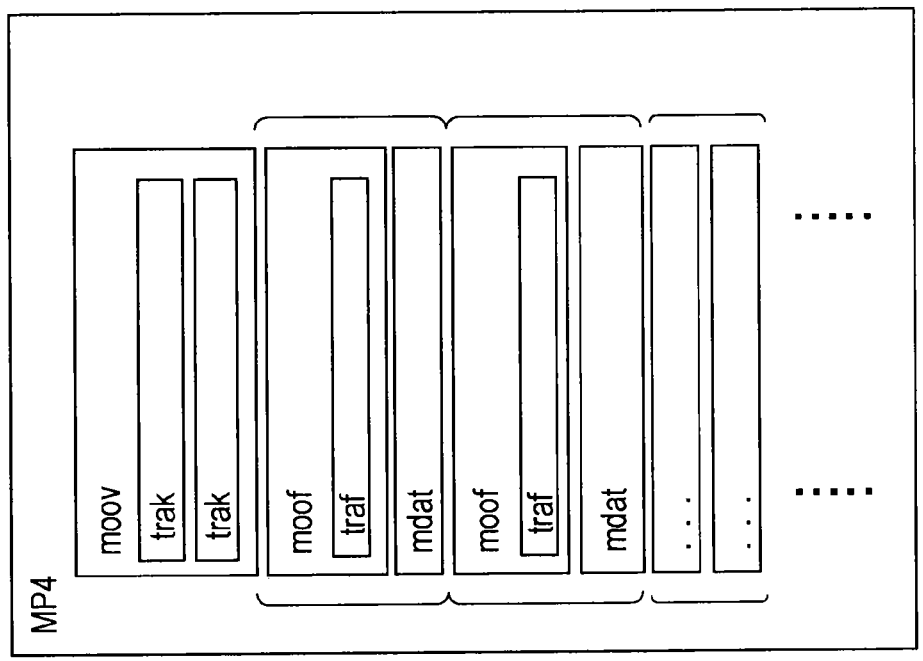

In FIGS. 6A and 6B, the following two examples are illustrated as examples of the MP4 format defined in ISO/IEC 14496-14:

FIG. 6A: fragmented (fragment type) MP4 file (fragmented movie); and

FIG. 6B: non-fragmented (non-fragment type) MP4 file (Non-fragmented movie).

The MP4 files illustrated in FIGS. 6A and 6B are files that are set in one processing unit in a data recording or reproducing process according to the MP4 format.

(a) The fragmented (fragment type) MP4 file (fragmented movie) is a file format in which data such as an image or audio which is reproduction target data is fragmented into pieces of reproduced data within a predetermined time and is stored.

(b) The non-fragmented (non-fragment type) MP4 file (Non-fragmented movie) is a file format in which data such as an image or audio which is reproduction target data is stored without fragmentation.

In the MP4 file, regions are set in units of boxes and data defined in the units of boxes is stored in each box.

Each box includes regions of a box size, a box type, and box data.

A data length (byte size) of the box is recorded in the box size.

A type of data stored in the box is recorded in the box type.

The type of data indicated by the box type is recorded in the box data.

In the fragmented (fragment type) MP4 file illustrated in FIG. 6A, the following types of box are set:
a moov box;
a trak box;
a moof box;
a traf box; and
a mdat box.

The above boxes are each set.

Actual data which is reproduction target data such as an image, audio, and subtitles is fragmented and stored in the mdat box.

The moof box matches each mdat box, and metadata such as attribute information and reproduction control information regarding the fragmented actual data stored in the mdat box matching the moof box is stored in the moof box.

The fragmented (fragment type) MP4 file illustrated in FIG. 6A has a structure in which each of a plurality of pieces of set data which is one piece of set data of actual data (mdat), which is fragmented data of the reproduction target data, and metadata (moof) corresponding to the fragmented actual data are stored and the metadata regarding all of the plurality of pieces of stored set data is stored in the moov box.

The traf box is set inside the metadata (moof) corresponding to the fragmented actual data.

In the traf box, reproduction sequence information or the like regarding the matching actual data (mdat) is stored in the traf box.

The moov box is a box that is set as a storage region of the metadata such as the reproduction control information of the data stored in all of the MP4 files.

One or more trak boxes are set inside the moov box. The trak box can be set according to, for example, the types of data such as an image, audio, and subtitles and stores the reproduction sequence information or the like regarding each piece of data.

When a plurality of pieces of different image data, e.g., HD images or 4K images, are included in the reproduced data stored in the MP4 file, an individual trak box can be set according to the types of images.

When a plurality of pieces of different audio data, e.g., Japanese audio or English audio, are included in the audio data stored in the MP4 file, the individual trak box can be set according to the types of audio.

Likewise, when a plurality of pieces of different subtitles data, e.g., Japanese subtitles or English subtitles, are included in the subtitles data stored in the MP4 file, the individual trak box can be set according to the types of subtitles.

(b) The non-fragmented (non-fragment type) MP4 file (Non-fragmented movie) is a file format in which data such as an image or audio which is reproduction target data is stored without fragmentation.

In the non-fragmented (non-fragment type) MP4 file illustrated in FIG. 6B, the following types of box are set:
a moov box;
a trak box; and
a mdat box.

The above boxes are each set.

In the mdat box, reproduction target actual data is stored.

In the moov box, metadata set to correspond to the actual data (mdat) which is reproduction target data, e.g., metadata including attributes of the reproduction target actual data (mdat) or reproduction control information, is stored.

In the trak box set inside the moov box, reproduction sequence information or the like regarding the actual data (mdat) is stored.

As in the (a) fragmented (fragment type) MP4 file described above, one or more trak boxes are also set inside the moov box set in the (b) non-fragmented (non-fragment type) MP4 file. Each trak box is set according to, for example, the types of data such as an image, audio, and subtitles.

FIGS. 6A and 6B illustrates a basic structure example of the MP4 format.

The DECE (Digital Entertainment Content Ecosystem) which is a standardization association regarding the MP4 format has standardized the CFF (Common File Format) as a new file format of an MP4 base. The CFF will be described with reference to FIG. 7.

The CFF (Common File Format) illustrated in FIG. 7 basically has the same data structure as the fragment-type (fragmented movie) MP4 described with reference to FIG. 6A.

Figure 7:
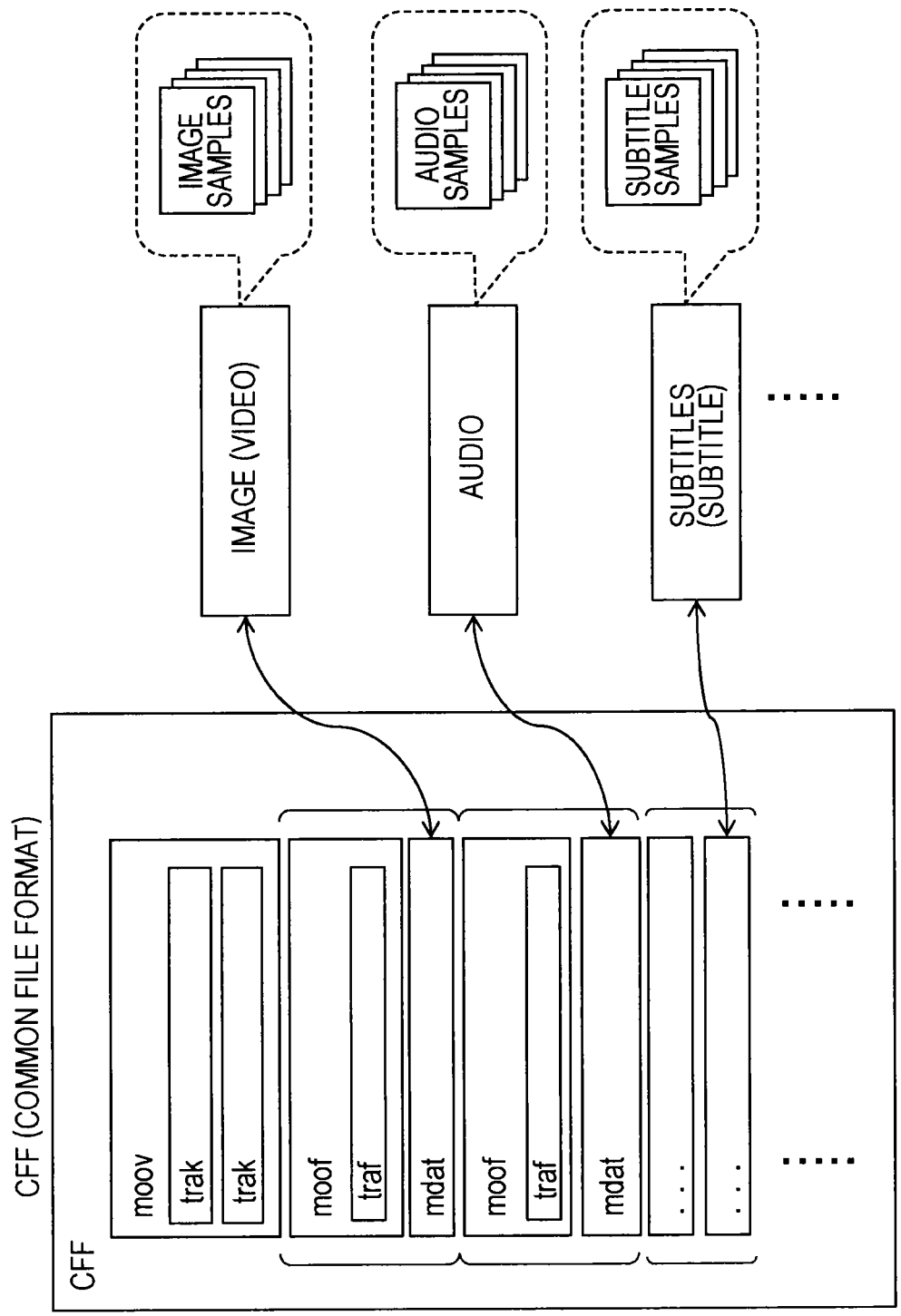
FIG. 7 is a diagram for describing the structure of a CFF (Common File Format)

That is, the following boxes are set in the CFF (Common File Format) file illustrated in FIG. 7, as in the fragmented (fragment type) MP4 file described above with reference to FIG. 6A:
a moov box;
a trak box;
a moof box;
a traf box; and
a mdat box.

The above boxes are each set.

Input data of each box is substantially the same as the fragmented (fragment type) MP4 file in FIG. 6A.

However, in the CFF, a restriction in which only one type of data is stored in each mdat box is imposed.

That is, one type of data is stored among the following pieces of data in each mdat box:

(a) image;
(b) audio; and
(c) subtitles.

There is the restriction in which the data of the above (a) to (c) does not have to be mixed and stored.

When a plurality of pieces of different image data, e.g., HD images or 4K images, are included in the CFF file, such different images are stored in different mdat boxes.

Likewise, different audio data, e.g., Japanese audio or English audio, is also stored in individual mdat boxes and Japanese subtitles, English subtitles, or the like are also stored in different mdat boxes.

In the general fragmented (fragment type) MP4 file illustrated in FIG. 6A, different types of data such as an image, audio, and subtitles are permitted to be mixed and stored in the mdat box set as a storage box of one piece of fragmented data (fragment).

In the CFF (Common File Format) illustrated in FIG. 7, however, the restriction in which only one type of data is stored in one mdat box is imposed.

That is, only one type of data, i.e., one of an image, audio, and the subtitles, is individually stored in each mdat box.

Accordingly, the moof box which is a metadata storage region corresponding to the mdat box is also set such that metadata set to correspond to one type of data, i.e., one of an image, audio, and subtitles, is stored.

The input data of the mdat box which is a data portion of the MP4 format is divided to a sample which is a basic data unit.

In the CFF (Common File Format), a collection of the same type of data sample, i.e., one of a collection of only image samples, or a collection of only audio samples, and a collection of only subtitle samples, is stored in one mdat box.

In the CFF defined in the DECE, encoding modes (codec) and data formats of an image, audio, subtitles permitted to be stored in a CFF file are also defined.

Examples of the data formats permitted to be stored in a CFF file include the following data formats:
 images (Videos): AVC (MPEG-4 AVC) and HEVC (MPEG-4 HEVC);
 audio (Audio): MPEG-4-ACC, Dolby, and AC-3; and
 subtitles (subtitle): SMPTE Timed Text (SMPTE-TT).

[2-3. Process of Converting MPEG-2 TS into MP4]

Next, an overview of a process of converting MPEG-2 TS format data recorded in, for example, a BD (Blu-ray (registered trademark) Disc) or MPEG-2 TS format data input through a network or broadcast waves into the MP4 format data and recording the data in a medium such as a flash memory will be described.

Hereinafter, an example of a converting process for AVC or HEVC encoded image data permitted to be stored with both of the MPEG-2 TS format and the MP4 format will be described.

That is, an example of a process will be described when AVC or HEVC encoded image data stored in conformity with the MPEG-2 TS format in a medium such as a BD is converted into MP4 format data of an encoded data storage format and the MP4 format data is recoded in a medium such as a flash memory.

First, a basic structure of the AVC or HEVC encoded image data will be described with reference to FIGS. 8A and 8B.

For example, encoded data corresponding to one piece of image data (one picture) and parameters applied to its decryption process are stored in a plurality of NAL units (Network Abstraction Layer Units).

An NAL unit set corresponding to one piece of image data is referred to as an access unit (AU).

That is, the AVC encoded image data and the HEVC encoded image data include the plurality of NAL units, as illustrated in FIG. 8A.

Each NAL unit includes an NAL header and NAL data. Attribute information (metadata) corresponding to the NAL data, such as data type identification information of the NAL unit, is stored in the NAL header.

In each NAL unit, for example, sequence information of the encoded data or parameters applied to a decryption process is stored in addition to the encoded data of an image.

The type of data stored in each NAL unit is identified by an ID of the NAL header.

The data stored in the NAL unit is, for example, the following data:
- (1) AU delimiter (AUD): a start position of an access unit (AU);
- (2) SPS: a sequence parameter;
- (3) PPS: a picture parameter;
- (4) SEI: various kinds of auxiliary information;
- (5) Slice data: a constituent element of encoded image (video) data;
- (6) Filler data: size adjustment data; and
- (7) End of **: an end position of the access unit (AU).

Such data is stored in each NAL unit.

When both of the MPEG-2 TS format and the MP4 format defining the storage format (container format) of the encoded data stores the AVC encoded image data or the HEVC encoded image data, the NAL units illustrated in FIGS. 8A and 8B are stored in conformity with each format.

FIGS. 9A and 9B illustrate an example in which the NAL units are stored in conformity with the two formats.

An example in FIG. 9A is an example in which the NAL units are stored in conformity with the MPEG-2 TS format and is referred to as a byte stream format.

An example in FIG. 9B is an example in which the NAL units are stored in conformity with the MP4 format and is referred to as a sample structure.

In the MPEG-2 TS format illustrated in FIG. 9A, a start code (SC) is set at a front position of each NAL unit.

The start code (SC) is an identifier indicating the start position of the NAL unit and is formed by a specific bit string (0x000001).

For example, a reproduction device performing a process for the MPEG-2 TS format data can detect the code (0x000001) of the start code (SC) and identify the subsequent position of the SC as an NAL unit start position. Through this identifying process, the NAL unit structure data can be exactly extracted.

On the other hand, in the MP4 format illustrated in FIG. 9B, length information (Length) is set at a front position of each NAL unit.

The length information (Length) is data indicating the length (size) of the data of a subsequent NAL unit and the data length (size) of each NAL unit is stored.

For example, a reproduction device performing a process for the MP4 format data can identify the data length of the NAL unit from a subsequent position based on the length information (Length) and extract the NAL unit structure data according to the data length (size).

The NAL unit can be set to have various data lengths, and thus the lengths of the NAL units become different.

As illustrated in FIGS. 9A and 9B, the MPEG-2 TS format and the MP4 format storing the AVC/HEVC image encoded data are different formats.

Specifically, the start code (SC) of the MPEG-2 TS is substituted with the length information (Length) in the MP4 format.

The NAL unit is stored in both of the MPEG-2 TS format and the MP4 format.

Accordingly, when the MPEG-2 TS format data is converted into the MP4 format data, it is necessary to perform processes of accurately determining the position of the start code (SC) of the MPEG-2 TS, acquiring the NAL unit from the MPEG-2 TS format data, and setting the NAL unit as the structure data of the MP4 format data.

[3. Setting of Variation Data Corresponding to Format Conversion]

As described above with reference to FIGS. 1A to 2, as the encryption structure of the MPEG-2 TS format data, there is the encryption structure in which the variation data which is the plurality of pieces of different encrypted data which can be decrypted with the different keys are set in the segment region and the source tracking process based on the reproduction path analysis can be performed.

The reproduction device can decrypt only one piece of variation data set in each segment region, and selects, decrypts, and reproduces one piece of variation data from each segment region along one reproduction path set to correspond to the reproduction device.

The variation data which can be decrypted by each reproduction device is only one piece of variation data selected from each segment region along the reproduction path set in the reproduction device. Accordingly, when the MPEG-2 TS format data having the variation data is converted into the MP4 format data such as the CFF (Common File Format) and is recorded in a medium, the reproduction device may not decrypt all of the variation data and re-encrypt the variation data in conformity with the MP4 format.

Hereinafter, a structure will be described in which when the MPEG-2 TS format data having the variation data is converted into the MP4 format data such as the CFF (Common File Format), the MP4 format data is recorded, and the data is reproduced from a medium recording the MP4 format data, only one piece of variation data set in each segment region can be decrypted along one reproduction path to perform reproduction.

According to this structure, the variation identifier can be detected from the reproduced data of the MP4 format data generated through the format conversion of the MPEG-2 TS format data, as described above with reference to FIG. 2. For example, when illegal copy content is circulated, it is possible to track a source of the copy data.

The following two embodiments will be sequentially described:
(First Embodiment) an embodiment in which the MPEG-2 TS variation data and the MP4 variation data are set in each segment region; and
(Second Embodiment) an embodiment in which the MP4 variation data is set only in some segment regions among a plurality of segment regions.

[3-1. (First Embodiment) Embodiment in Which MPEG-2 TS Variation Data and MP4 Variation Data Are Set in Each Segment Region]

First, an embodiment in which the MPEG-2 TS variation data and the MP4 variation data are set in each segment region will be described as the first embodiment.

FIGS. 10A and 10B illustrate a setting example of the variation data according to the first embodiment. In FIG. 10, the following two drawings are illustrated:
FIG. 10A: MPEG-2 TS format data; and
FIG. 10B: MP4 format data.

FIG. 10A illustrates the MPEG-2 TS format data which is reproduction target data recorded on, for example, a BD (Blu-ray (registered trademark) Disc).

The data is data that has the segment region described above with reference to FIGS. 1 and 2, i.e., the segment region in which the plurality of pieces of variation data decryptable with different keys are set.

An example illustrated in FIG. 10A is content in which n segment regions are set. Sixteen (Sx-1 to Sx-16) pieces of variation data are set in each segment region.

In the first embodiment, eight (Sx-1 to Sx-8) pieces of variation data of the half of the sixteen pieces of variation data set in each segment region are set as variation data corresponding to the MPEG-2 TS format, i.e., MPEG-2 TS variation data 81. Eight (Sx-9 to Sx-16) pieces of variation data of the remaining half are set as variation data corresponding to the MP4 format, i.e., MP4 variation data 82.

Further, x=1 to n and the same setting is performed on all of the segment regions (Sx=S1 to Sn).

A reproduction path along which one of the eight pieces of variation data (Sx-1 to Sx-8) is selected is set in each segment region is allocated to the reproduction device reproducing the MPEG-2 TS format data.

A reproduction path along which the eight pieces of variation data (Sx-9 to Sx-16) of the second half are selected is not set in the reproduction device reproducing the MPEG-2 TS format data.

The eight pieces of variation data (Sx-9 to Sx-16) of the second half are data for the MP4 format and are the variation data which can be selected by the reproduction device reproducing the MP4 format data.

A reproduction path along which one of the eight pieces of MP4 variation data (Sx-9 to Sx-16) 82 of each segment region is selected is allocated to the reproduction device reproducing the MP4 format data.

FIG. 10A illustrates the MPEG-2 TS format data which is the reproduction target data recorded on, for example, a BD (Blu-ray (registered trademark) Disc).

A content copy process of performing format conversion on the MPEG-2 TS format data illustrated in FIG. 10A and recording the converted data as MP4 format data on, for example, a second medium such as an SD card is performed.

The device performing the copy process selects only the variation data (Sx-9 to Sx-16) corresponding to the MP4 as copy targets in each segment region illustrated in FIG. 10A. The pieces of variation data (Sx-1 to Sx-8) of the first half corresponding to the MPEG-2 TS are not set as the copy process targets.

The MP4 format data generated through the copy process involving the format conversion is the MP4 format data illustrated in FIG. 10B.

The MP4 format data illustrated in FIG. 10B is, for example, the MP4 format data stored in a medium such as a flash memory of a smartphone or the like.

The MP4 format data is configured as the MP4 file illustrated in FIGS. 6A to 7, as described above. In the MP4 file described with reference to FIGS. 6A to 7 and the like, the boxes are set according to the types of data and the reproduction target data is stored in the mdat box.

The data illustrated in FIG. 10B is the reproduction target data stored in the mdat box.

The segment regions are set in the data illustrated in FIG. 10B and MP4 variation data 82 decryptable with different keys is set in each segment region.

Each of the segment regions (Sx-S1 to Sn) has eight pieces of variation data (Sx-9 to Sx-16).

The variation data is the variation data (Sx-9 to Sx-16) of the second half set in each segment region of the MPEG-2 TS format data illustrated in FIG. 10A.

The device converting the MPEG-2 TS format data into the MP4 format data selects the variation data (Sx-9 to Sx-16) of the second half from each segment region and directly records the variation data in the mdat box of the MP4 file. That is, the variation data is recorded in the MP4 file while the encrypted variation data remains without performing the decryption process of the re-encryption process.

The MP4 format data illustrated in FIG. 10B is reproduced by, for example, a reproduction device such as a smartphone.

A key used to decrypt one piece of variation data in the variation data set in each segment region of the data illustrated in FIG. 10B is stored or supplied to the reproduction device such as a smartphone. One piece of variation data is decrypted and reproduced by applying the key.

One reproduction path is allocated to the reproduction device reproducing the MP4 format data. Each reproduction device selects one piece of variation data from each segment based on the reproduction path corresponding to the reproduction device and performs decryption and reproduction.

FIGS. 11A and 11B are diagrams for describing an example of the reproduction path set in each reproduction device such as a smartphone reproducing the MP4 format data stored in a medium such as a flash memory.

In FIGS. 11A and 11B, the following drawings are illustrated:

FIG. 11A: reproduction path A of the reproduction device A; and

FIG. 11B: reproduction path B of the reproduction device B.

One elliptic region represents image data sequentially reproduced along the time axis (time) illustrated from the left to the right of the drawing.

A plurality of pieces of variation data (Sx-9 to Sx-16) are set in each segment region. The pieces of variation data are encrypted data decryptable with different keys (segment keys). As described with reference to FIGS. 10A and 10B, the encrypted data recorded inside the MPEG-2 TS format data is set as the MP4 format data without change.

Each reproduction device can select and reproduce one piece of variation data from each segment by applying a key stored in the self-reproduction device or a key supplied from the outside.

In the example illustrated in FIGS. 11A and 11B, n segment regions (segments 1 to n) are set in content.

In each of the segments 1 to n, variation data (=data decryptable with different keys) encrypted with eight different keys is set.

In the example illustrated in FIG. 11A, a reproduction path of the reproduction device A is illustrated.

The reproduction device A sequentially selects and reproduces data of the single data region and data of each segment region.

The following data is each sequentially selected and reproduced from the segment region:

[S1-16]→[S2-9]→[S3-11] . . . →[Sn-9].

The variation data is the reproduction target variation data of the segment region included in the reproduction path A of the reproduction device A.

The reproduction device A selects and reproduces the decryptable data of the reproduction device A from the eight pieces of variation data (encrypted data) set in the segment regions.

On the other hand, the reproduction device B illustrated in FIG. 11B sequentially selects and reproduces each of the following data from each segment:

[S1-11]→[S2-10]→[S3-16] . . . →[Sn-11].

The variation data is the reproduction target variation data of the segment region included in the reproduction path B of the reproduction device B.

The reproduction device B selects and reproduces the decryptable data of the reproduction device A from the eight pieces of variation data (encrypted data) set in the segment regions.

When the reproduction path A of the reproduction device A is compared to the reproduction path B of the reproduction device B, the reproduced data of the single data region other than the segment regions is common. However, the variation data to be reproduced in the segment regions is different data.

An identifier indicating certain variation data, i.e., variation data identifier such as [Sx-xxx], is embedded in the variation data set in the segment region in each reproduction path.

That is, by analyzing reproduced image data, it can be determined which variation data is reproduced.

The reproduced image data by each reproduction device and an image analysis process for the reproduced image data will be described with reference to FIG. 12.

The MP4 content including the segment regions and the single data region described with reference to FIGS. 11A and 11B is stored in an information recording medium 100 illustrated in FIG. 12.

A reproduction device A110 performs content reproduction along the reproduction path A described with reference to FIG. 11A.

A reproduction device B120 performs content reproduction along the reproduction path B described with reference to FIG. 11A.

A reproduced image A, 111 is the variation data selected from one segment region and is the variation data included in the reproduction path A, e.g., [S1-16].

A reproduced image B, 121 is another variation data selected from the same segment region and is the variation data included in the reproduction path B, e.g., [S1-11].

Both of the two reproduced images A and B are, for example, images of the same scene of movie content and are images which viewers watch without distinction.

The reproduced image A, 111 is the variation data [S1-16] included in the reproduction path A and identification information (variation data identifier) indicating the variation data [S1-16] is embedded in the reproduced image A, 111. For example, the identification information is embedded according to a technology such as digital watermark.

The other reproduced image B, 121 is the variation data [S1-11] included in the reproduction path B and identification information (variation data identifier) indicating the variation data [S1-11] is embedded in the reproduced image B, 121.

In the content illustrated in FIGS. 11A and 11B, n segment regions are set.

For example, in a case in which illegally circulated copy content is found from a network, a reproduction path of the content is revealed when it is determined which variation data reproduced images in the n segment regions included in the illegally circulated content are.

For example, when illegally circulated copy content is the content formed from the reproduction path A illustrated in FIGS. 11A and 11B, the copy content can be determined in such a manner that the content decrypted by the reproduction device A illustrated in FIG. 12 is original data and the reproduction device A is a source of the illegal copy content.

For example, when illegally circulated copy content is the content formed from the reproduction path B illustrated in FIGS. 11A and 11B, the copy content can be determined in such a manner that the content decrypted by the reproduction device B illustrated in FIG. 12 is original data and the reproduction device B is a source of the illegal copy content.

Thus, in the MP4 format data, the encryption structure is also realized in which the source tracking can be performed as in the MPEG-2 TS format data described above with reference to FIGS. 1 and 2.

[3-2 (Second Embodiment) Embodiment in Which MP4 Variation Data is Set in Only Some Segment Regions of Plurality of Segment Regions]

Next, an embodiment in which the MP4 variation data is set only in some segment regions of the plurality segment regions will be described as the second embodiment.

FIGS. 13A and 13B illustrate a setting example of the variation data according to the second embodiment. In FIG. 13, the following two drawings are illustrated:

FIG. 13A: MPEG-2 TS format data; and
FIG. 13B: MP4 format data.

FIG. 13A illustrates the MPEG-2 TS format data which is reproduction target data recorded on, for example, a BD (Blu-ray (registered trademark) Disc).

The data is data that has the segment region described above with reference to FIGS. 1 and 2, i.e., the segment region in which the plurality of pieces of variation data decryptable with different keys are set.

An example illustrated in FIG. 13A is content in which n segment regions are set. In this example, sixteen (Sx-1 to Sx-16) pieces of variation data are set in each segment region.

In the embodiment, MP4 variation data 153 is set in some segment regions, e.g., segments 2, 4, 6, etc., which are every other segment regions, among the n segments.

The content with the MPEG-2 TS format illustrated in FIG. 13A includes the following two regions:
(a) single data region having single data commonly reproduced by all of the reproduction devices; and
(b) segment regions.

The segment regions are divided into the following segment regions:
(b1) MP4 variation data non-set segment region in which no MP4 variation data is set; and
(b2) MP4 variation data set segment region in which a plurality of pieces of MP4 variation data are set.

The MP4 variation data set segment region in which the MP4 variation data 153 is set, e.g., the segment 2 in FIG. 13A, has sixteen pieces of variation data S2-1 to S2-16.

One piece of variation data (S2-1) 152 among the sixteen pieces of variation data is data reproduced in the reproduction device that performs a reproduction process on the MPEG-2 TS format data.

On the other hand, the remaining variation data (S2-2 to S2-16) are the MP4 variation data 153 selectively reproduced in the reproduction device that performs the reproduction process on the MP4 format data.

The MP4 variation data set segment region has only one piece of variation data selectable in the reproduction device of the MPEG-2 TS format data.

That is, in the MP4 variation data set segment region, one piece of common variation data is reproduced by all of the reproduction devices (MPEG-2 TS format data reproduction devices), as in the single data region in which one piece of common reproduction data is set.

For the segment region in which no MP4 variation data is set, i.e., the MP4 variation data non-set segment region such as segments 1, 3, 5, etc. illustrated in the drawing, the reproduction device of the MPEG-2 TS format data selects and reproduces one piece of variation data from the sixteen pieces of MPEG-2 TS variation data 151.

That is, only the MP4 variation data non-set segment regions (segments 1, 3, 5, 7, etc.) of the half of the n segment regions are used as the same segment regions as the regions of the related art in which one piece of variation data is selected and reproduced from the plurality of pieces of variation data.

On the other hand, for the remaining segment regions, i.e., the MP4 variation data set segment regions (segments 2, 4, 6, etc.) in which the MP4 variation data 153 is set, one piece of variation data (Sx-1) is commonly selected and reproduced by the reproduction devices that reproduce the MPEG-2 TS format data. That is, as in the single data set region, the common data is reproduced in all of the reproduction devices.

All of the other variation data (Sx-2 to Sx-16) excluding one piece of variation data (Sx-1) in the MP4 variation data set segment regions are the MP4 variation data and are the data not included in the reproduction path permitted to the reproduction device of the MPEG-2 TS format data.

FIG. 13A illustrates the MPEG-2 TS format data which is reproduction target data recorded on, for example, a BD (Blu-ray (registered trademark) Disc).

A content copy process of performing format conversion on the MPEG-2 TS format data illustrated in FIG. 13A and recording the converted data as MP4 format data on, for example, a second medium such as an SD card is performed.

The device performing the copy process selects only the variation data (Sx-2 to Sx-16) corresponding to the MP4 as copy targets from the MP4 variation data set segment regions (segments 2, 4, 6, etc.) in which the variation data corresponding to the MP4 is set among the segment regions (S1 to Sn) illustrated in FIG. 13A. The variation data (Sx-1) corresponding to the MPEG-2 TS is not subjected to the copy process.

For the MP4 variation data non-set segment regions (segments 1, 3, 5, etc.) in which no variation data corresponding to the MP4 is set, only the variation data decryptable by the reproduction device performing the copy process is selected and stored in the MP4 file.

The other variation data is not set as the copy targets.

For example, in the example illustrated in FIG. 13A, the following data is assumed to be the variation data selected along the reproduction path supplied to the reproduction device performing the copy process:
  the variation data S1-1 of the segment 1 (S1);
  the variation data S2-1 of the segment 2 (S2);
  the variation data S3-2 of the segment 3 (S3); and etc.

For example, of the foregoing segments (S1 to S3), the segment regions in which no variation data corresponding to the MP4 is set in the segments are the segments 1 and 3.

For these segments, only the variation data decryptable by the reproduction device performing the copy process, i.e., the following variation data, are selected and stored in the MP4 file:
  the variation data S1-1 of the segment 1 (S1); and
  the variation data S3-2 of the segment 3 (S3).

The other variation data (S1-2 to S1-16, S3-1, and S3-3 to S3-16) are not set as the copy targets.

The MP4 format data generated through the copy process involving the format conversion are the MP4 format data illustrated in FIG. 13B.

The MP4 format data illustrated in FIG. 13B are the MP4 format data stored in, for example, a medium such as a flash memory of a smartphone.

The MP4 format data is configured as the MP4 file illustrated in FIGS. 6A to 7 described above. In the MP4 file described with reference to FIGS. 6A to 7 and the like, the boxes are set according to the types of data and the reproduction target data is stored in the mdat box.

The data illustrated in FIG. 13B is the reproduction target data stored in the mdat box.

In the data illustrated in FIG. 13B, the segment regions are set.

The segment regions in which the variation data decryptable with different keys are set are the segments 2, 4, 6, etc. which are every other segments.

In these remaining segments 1, 3, 5, etc., only one piece of reproduction target data is set and the same process as the process on the single data region is performed, i.e., only one piece of data reproduced commonly in all of the MP4 reproduction devices is set.

This data corresponds to the variation data decryptable by the device performing the copy process involving the format conversion.

On the other hand, the segment regions (S2, 4, 6, etc.) having the plurality of pieces of variation data have fifteen pieces of variation data.

These pieces of variation data are fifteen MP4 variation data (Sx-2 to Sx-16) set in the every other MP4 variation data set segment regions (segments 2, 4, 6, etc.) of the MPEG-2 TS format data illustrated in FIG. 13A.

The device converting the MPEG-2 TS format data into the MP4 format data selects the MP4 variation data (Sx-2 to Sx-16) from the "MP4 variation data set segment regions" in the MPEG-2 TS format data and records the selected variation data directly in the mdat box of the MP4 file. That is, the variation data is recorded in the MP4 file while the encrypted variation data remains without performing the decryption process or the re-encryption process.

The MP4 format data illustrated in FIG. 13B is reproduced in, for example, a reproduction device such as a smartphone.

The reproduction device such as a smartphone stores keys, which are used to decrypt one piece of variation data in the variation data set in the every other segment regions (segments 2, 4, 6, etc.) of the data illustrated in FIG. 13B, in a memory or inputs the keys from the outside. One piece of variation data is decrypted and reproduced by applying the key.

That is, the reproduction path corresponding to each reproduction device reproducing the MP4 format data is set, and the reproduction device selects one piece of variation data from each segment region based on the reproduction path of the self-reproduction device, performs the decryption, and perform the reproduction process.

The identifier indicating certain variation data, i.e., the variation data identifier such as [Sx-xxx], is embedded in the variation data set in the segment regions in each reproduction path.

That is, by analyzing the reproduced image data, it is possible to determine which variation data is reproduced.

[4. Sequence of Data Recording Process and MP4 Format Data Reproduction Process Involving Format Conversion]

The two embodiments have been described as the setting examples of the variation data corresponding to the format conversion with reference to FIGS. 10A to 12 and 13.

Next, a sequence of the recording process involving the format conversion of the data having the two variation data setting structures and a sequence of the reproduction process for the MP4 format data after the format conversion will be described.

That is, the following sequences will be described:
  a sequence of a process of reading the MPEG-2 TS format data having the variation data setting structure illustrated in FIG. 10A or 13A from the first medium, converting the format of the data into the MP4 format, and recording the converted data on the second medium; and a sequence of a process of reproducing the MP4 format data recorded on the second medium.

The process sequences corresponding to the following two embodiments described with reference to FIGS. 10A to 12 and 13 will be sequentially described:

(First Embodiment) the embodiment in which the MPEG-2 TS variation data and the MP4 variation data are set in each segment region; and (Second Embodiment) the embodiment in which the MP4 variation data is set only in some segment regions among a plurality of segment regions.

[4-1. Process Sequence in Embodiment in Which MPEG-2 TS Variation Data and MP4 Variation Data Are Set in Each Segment Region]

Figure 15:
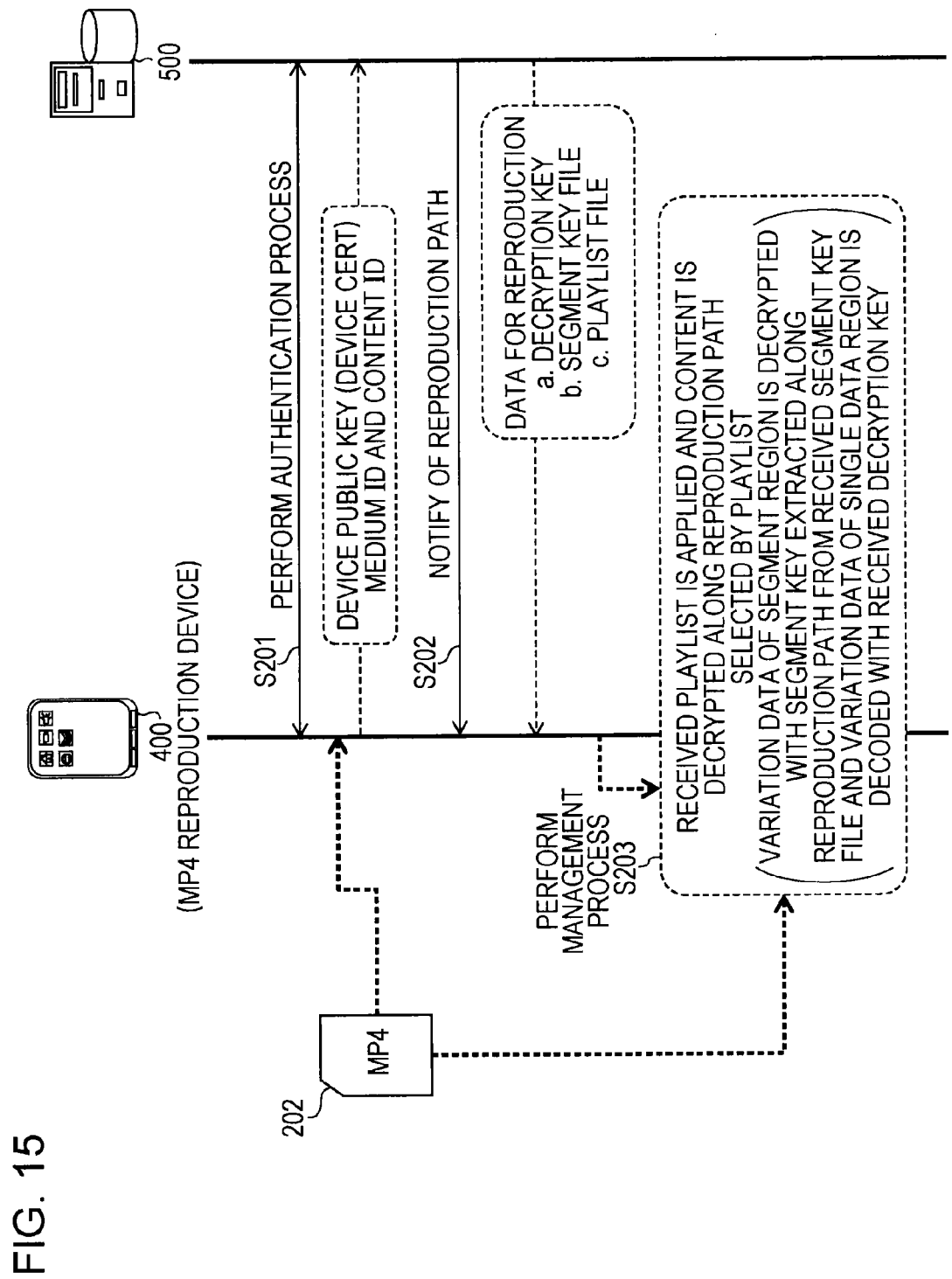
FIG. 15 is a sequence diagram for describing a reproduction sequence of MP4 format data generated through a data recording process involving format conversion according to an embodiment of the present disclosure.

First, the first embodiment described above with reference to FIGS. 10A to 12, i.e., the sequence of the process of reading the MPEG-2 TS format data having the structure in which the MPEG-2 TS variation data and the MP4 variation data are set in each segment region from the first medium, converting the read variation data into the data with the MP4 format, and recording the converted data on the second medium and the sequence of the process of reproducing the MP4 format data recorded on the second medium, will be described with reference to FIGS. 14 and 15.

FIG. 14 is a sequence diagram for describing a sequence of a data recording process involving the format conversion.

An information processing device 200 illustrated in FIG. 14 performs the format conversion from the MPEG-2 TS format to the MP4 format.

In a first medium 201, content 213 with the MPEG-2 TS format having the setting of the variation data described with reference to FIG. 10A is stored.

That is, in the content 213, the MPEG-2 TS variation data and the MP4 variation data are set in each segment region.

The first medium 201 is, for example, a BD (Blu-ray (registered trademark) Disc).

In the first medium 201, a medium ID 211 which is an identifier unique to a medium and a content ID 212 which is an identifier of the content are stored in addition to the content 213. The medium ID 211 is, for example, a PMSN (Prerecordede Media Serial Number) which is recorded through a physical recording process and is difficult to be rewritten on a medium (disc).

The information processing device 200 reads the content 213 recorded in conformity with the MPEG-2 TS format from the first medium 201, performs the format conversion to generate the MP4 format data, and records the MP4 format data on the second medium 202.

The second medium 202 includes, for example, a flash memory such as an SD card.

The information processing device 200 mounts two media, i.e., the first medium 201 and the second medium 202, performs the format conversion on the content 213 read from the first medium 201, and records the MP4 format data generated through the format conversion on the second medium 202.

Hereinafter, processes of steps will be sequentially described.

(Step S101)

The information processing device 200 mounting the first medium 201 and the second medium 202 first performs an authentication process with a copy management server 300 in step S101.

The copy management server 300 is a server that manages content recorded on the first medium 201. The information processing device 200 can record (copy) the data (the content 213) recorded on the first medium 201 to another medium under the condition that an export permission notification (=copy permission notification) serving as copy permission information from the copy management server 300 is received.

In step S101, the information processing device 200 performs the authentication process with the copy management server 300.

For example, mutual authentication is performed in conformity with a public key encryption scheme.

The information processing device 200 transmits a public key certificate (Device Cert) stored in a memory of the self-information processing device 200 to the copy management server 300.

The copy management server 300 also supplies a public key certificate (Server Cert) of the server to the information processing device 200.

Through the process involving the exchange of the public key certificates, the mutual authentication process of confirming legitimacy of both of the device and the server is performed.

When the mutual authentication process is performed or after the mutual authentication process is established, the information processing device 200 transmits the medium ID 211 read from the mounted first medium 201 or the content ID 212 to the copy management server 300.

The medium ID or the content ID is used as data for specifying the copy target content 213 stored in the first medium 201.

The copy management server 300 specifies the copy target content based on the medium ID 211 or the content ID 212 and determines whether to perform copy permission.

When the mutual authentication process of step S101 is established and the legitimacy of both of the devices is confirmed, the process proceeds to step S102.

When the mutual authentication is not established, the process of step S102 is not performed. That is, the information processing device 200 does not receive the export permission (copy permission) notification from the copy management server 300 and may not perform the content copy process.

(Step S102)

When the mutual authentication process of step S101 is established and the legitimacy of both of the devices is confirmed, the process proceeds to step S102.

In step S102, the copy management server 300 notifies the information processing device 200 of the export permission (copy permission). That is, permission information permitting the content recorded on the first medium 201 to be recorded on the second medium 202 is notified of.

When the export permission (copy permission) notification process in step S102 is performed, the copy management server 300 transmits the following key to the information processing device 200:

a. re-encryption key.

The re-encryption key is a key used to encrypt the content including the MP4 format data stored in the second medium 202.

The information processing device 200 records, on the second medium 202, encrypted content generated by decrypting the content 201 read from the first medium 201 and performing an encryption process on the decrypted content in conformity with the regulations of the MP4 format. The re-encryption key is a key that is applied to perform the encryption process in conformity with the regulations of the MP4 format.

The re-encryption key does not include a key corresponding to the variation data of the segment region.

In the variation data set structure of the first embodiment, as described with reference to FIGS. 10A and 10B, the variation data of the segment region is as follows:

(1) MPEG-2 TS variation data; and
(2) MP4 variation data.

The variation data is clearly distinguished and set as such two types of variation data. When the information processing device 200 records the MP4 format data, the MP4 variation data is read from the segment region directly, i.e., while the encrypted data remains, from the first medium 201 and is recorded on the second medium 202.

When the export permission (copy permission) notification process in step S102 is performed, the copy management server 300 transmits the re-encryption key to the information processing device 200 and transmits the following data, as necessary:

b. segment key file; and
c. playlist file.

Such data is transmitted.

The segment key file is a file that stores a key (segment key) is applied to the decryption of the variation data to be reproduced along the reproduction path set in the information processing device 200.

The segment key stored in the segment key file is encrypted and the segment key used to decrypt the variation data corresponding to the reproduction path is structured to be acquirable by performing decryption with the key maintained in the information processing device 200.

The segment key file transmitted from the server 300 to the information processing device 200 is assumed to be a file formed by only the segment keys necessary to decrypt the variation data to be reproduced along the reproduction path set in the information processing device 200.

Alternatively, the segment key file may be set such that all of the segment keys applied to the decryption of all of the variation data present in all of the segment regions included in the content are included as the encrypted data. However, at the time of this setting, a segment key file is generated and transmitted which has a structure decryptable with the keys owned by the reproduction device and includes only segment keys necessary to decrypt the variation data of the reproduction target present on the reproduction path of which the information processing device 200 is notified.

The playlist file is a reproduction control information file that is used to reproduce the content 213 along the reproduction path set in the information processing device 200.

One reproduction path can correspond to one playlist.

That is, in order to reproduce content of another reproduction path, it is necessary to use another playlist.

The following files are recorded on the first medium 201 recording the content 213:

b. segment key file; and
c. playlist file.

When these pieces of data are recorded, the information processing device 200 can read the data from the first medium 201 and these pieces of data are not necessary to be transmitted from the copy management server 300.

The data supplied from the copy management server 300 to the information processing device 200 in step S102 is preferably structured to be encrypted and supplied with, for example, a session key shared through a mutual authentication process.

(Step S103)

The information processing device 200 receiving the export permission (copy permission) notification from the copy management server 300 and receiving the data such as the re-encryption key performs a data recording process involving the format conversion on the content 213 recorded on the first medium 201 using the received data or the data recorded on the first medium 201.

The content 213 which is a format conversion target has the data structure described with reference to FIG. 10A. That is, the content includes the following two regions:

(a) single data region having single data reproduced commonly by all of the reproduction devices; and
(b) segment regions having a plurality of pieces of variation data selected according to the reproduction device.

The content includes such two regions.

Further, the segment region includes the following two pieces of variation data:

the MPEG-2 TS variation data; and
the MP4 variation data.

The information processing device 200 performs the following process on the single data region and the segment region.

The signal data is acquired from the single data region, the single data is decrypted with the key owned by the reproduction device, the format conversion from the MPEG-2 TS format to the MP4 format is performed, the data is re-encrypted with the re-encryption key acquired from the server, and is recorded on the second medium on which the MP4 format data is recorded.

Only the MP4 variation data is selected from the segment region and is recorded directly on the second medium.

Since the MP4 variation data recorded in the segment region is recorded as encrypted data corresponding to the MP4 format from the beginning, a process of recording the MP4 variation data on the second medium 202, while the encrypted data remains, without performing the decryption process and the re-encryption process is performed.

Through such a process, the MP4 format data is generated and recorded on the second medium 202.

Here, the process of converting only the reproduction target data has been described. However, for other reproduction control information or the like, the information processing device 200 also performs a process of converting data recorded on the first medium 201 into MP4 format data and recording the MP4 format data.

Next, a process sequence when the MP4 format data recorded on the second medium 202 is reproduced in the sequence described with reference to FIG. 14 will be described with reference to FIG. 15.

FIG. 15 illustrates the second medium 202 that stores the MP4 format data recorded in the sequence described with reference to FIG. 14 and an information processing device 400 which is a reproduction device that mounts the second medium 202 and performs a process of reproducing the MP4 format data.

Further, an MP4 content management server 500 is illustrated which performs communication with the information processing device 400, notifies a reproduction path permitted to the information processing device 400, and performs a process of supplying data necessary for reproduction.

A reproduction target content stored in the second medium 202 is the MP4 format data. This content has the structure described above with reference to FIG. 10B. That is, the content includes segment regions including a plurality of pieces of variation data decryptable with different keys (segment keys).

On the second medium 202, a content ID which is a content identifier is recorded in addition to the content. The content ID is a content ID that is read from the first medium 201 when the content copy process described with reference to FIG. 14 is performed.

A medium ID which is identification information of the second medium 202 is recorded on the second medium 202.

The information processing device 400 mounts the second medium 202 and reproduces the content as the MP4 format data.

In the reproduction process, a decryption key (segment key) of the variation data which is structure data of the content is necessary.

The segment key is not recorded on the second medium 202 and is supplied from the MP4 content management server 500.

Hereinafter, processes of steps of the sequence diagram illustrated in FIG. 15 will be sequentially described.

(Step S201)

The information processing device 400 mounting the second medium 202 first performs an authentication process with the MP4 content management server 500 in step S201.

For example, mutual authentication is performed in conformity with a public key encryption scheme.

The information processing device 400 transmits a public key certificate (Device Cert) stored in a memory of the self-information processing device 200 to the MP4 content management server 500.

The MP4 content management server 500 also supplies a public key certificate (Server Cert) of the server to the information processing device 400.

Through the process involving the exchange of the public key certificates, the mutual authentication process of confirming legitimacy of both of the device and the server is performed.

When the mutual authentication process is performed or after the mutual authentication process is established, the information processing device 400 transmits the medium ID read from the mounted second medium 202 or the content ID to the MP4 content management server 500.

The medium ID or the content ID is used as data for specifying the content stored in the second medium 202.

The MP4 content management server 500 specifies the reproduction target content based on the medium ID or the content ID and transmits the following data to be applied to the reproduction to the information processing device 400:
  a. decryption key;
  b. segment key file; and
  c. playlist file.

Such data is supplied to the information processing device 400.

When the mutual authentication process of step S201 is established and the legitimacy of both of the devices is confirmed, the process proceeds to step S202.

When the mutual authentication is not established, the process of step S202 is not performed. That is, the information processing device 400 does not receive the decryption key, the segment key file, and the playlist file from the server and may not perform the content reproduction.

(Step S202)

When the mutual authentication process of step S201 is established and the legitimacy of both of the devices is confirmed, the process proceeds to step S202.

In step S202, the MP4 content management server 500 notifies the information processing device 400 of the reproduction path. That is, this reproduction path is, for example, the reproduction path described above with reference to FIGS. 11 and 12 and the like.

The individual identifier of the reproduction path, e.g., a reproduction path number, is set in the reproduction path.

Then, the MP4 content management server 500 notifies the information processing device 400 of the reproduction path number.

With the notification of the reproduction path, the MP4 content management server 500 transmits the following data to the information processing device 400:
  a. decryption key;
  b. segment key file; and
  c. playlist file.

Such data is transmitted to the information processing device 400.

The a. decryption key is, for example, a key that is applied to decrypt the encrypted data of the single data region in the content structure data.

The b. segment key file is a file in which a segment key necessary to decrypt the variation data set in the segment region of the content is stored.

The segment key which the information processing device 400 can acquire from the segment key file is only the segment key applied to the description of the variation data selected along the reproduction path of which the information processing device 400 is notified.

The reproduction path is determined, for example, according to the information processing device (reproduction device), as described above with reference to FIGS. 11A and 11B.

The MP4 content management server 500 notifies the information processing device 400 of the reproduction path permitted to the information processing device 400, and generates and supplies the segment key file for which the segment key applied to the decryption of the variation data of each segment region reproduced along the notified reproduction path can be acquired by the information processing device 400.

The segment key stored in the segment key file is encrypted, and thus the segment key may be structured to be acquired through decryption with the key maintained in the information processing device 400.

The segment key file transmitted from the MP4 content management server 500 to the information processing device 400 is assumed to be a file formed by only the segment keys necessary to decrypt the variation data to be reproduced along the reproduction path of which the information processing device 400 is notified.

Alternatively, the segment key file may be set such that all of the segment keys applied to the decryption of all of the variation data present in all of the segment regions included in the content are included as the encrypted data. However, at the time of this setting, a segment key file is generated and transmitted which has a structure decryptable with the keys owned by the information processing device 400 and includes only segment keys necessary to decrypt the variation data of the reproduction target present on the reproduction path of which the information processing device 400 is notified.

The c. the playlist file is reproduction control information used to reproduce the content along the reproduction path of which the MP4 content management server 500 notifies the information processing device 400.

One reproduction path can correspond to one playlist.

That is, in order to reproduce content of another reproduction path, it is necessary to use another playlist.

In the example illustrated in the drawing, the MP4 content management server 500 notifies the information processing device 400 of one reproduction path is in step S202, and the playlist used to reproduce the content along the notified reproduction path is supplied from the MP4 content management server 500 to the information processing device 400.

The data supplied from the MP4 content management server 500 to the information processing device 400 is preferably structured to be encrypted and supplied with, for example, a session key shared in the mutual authentication process.

(Step S203)

The MP4 content management server 500 notifies the information processing device 400 of the reproduction path, and the information processing device 400 receiving each of the following data decrypts the content in conformity with the MP4 format stored in the second medium 202 using the received data and performs the reproduction process:

a. decryption key;
b. segment key file storing the segment key to be applied to the decryption of the variation data set in the notified reproduction path; and
c. playlist file which is reproduction control information used to reproduce the content according to the notified reproduction path.

The content stored in the second medium 202 is the MP4 format data and is content in which the plurality of pieces of variation data are set in each segment region, as described above with reference to FIG. 10B.

When the content is reproduced, the content is reproduced according to the playlist in which the reproduction control information used to reproduce the content along the reproduction path of the reproduction target content is recorded.

In the segment region of the content, the plurality of pieces of variation data decryptable with different keys are set.

The information processing device 400 decrypts and reproduces one piece of variation data selected from each segment region using, for example, the segment key decrypted to be obtainable by applying the key stored in the memory of the self-information processing device from the segment key file received from the MP4 content management server 500.

One reproduction path is automatically selected through the reproduction process in which the playlist received from the MP4 content management server 500 is applied, and one piece of variation data is sequentially selected from each segment region. The information processing device 400 decrypts the selected variation data with the segment key corresponding to the variation data acquired from the segment key file and performs the reproduction.

Variation data identification information (Forensic Mark) indicating certain variation data is embedded in the variation data such as an image obtained through this decryption process.

This variation data identification information is the variation data identification information (Forensic Mark) described above with reference to FIG. 12.

For example, when illegal circulated content is detected, it is possible to perform source tracking based on the variation data identification information (Forensic Mark).

[4-2. Process Sequence in Embodiment in Which MP4 Variation Data is Set in Only Some Segment Regions of Plurality of Segment Regions]

Next, a process sequence corresponding to the second embodiment described above with reference to FIGS. 13A and 13B will be described.

Hereinafter, the following sequences will be described with reference to FIGS. 16 and 17:

a sequence of a process of reading the MPEG-2 TS format data having a structure in which the MP4 variation data is set only in some segment regions among the plurality of segment regions from the first medium, converting the read format data into the MP4 format data, and recording the converted data on the second medium; and a sequence of a process of reproducing the MP4 format data recorded on the second medium.

Figure 16:
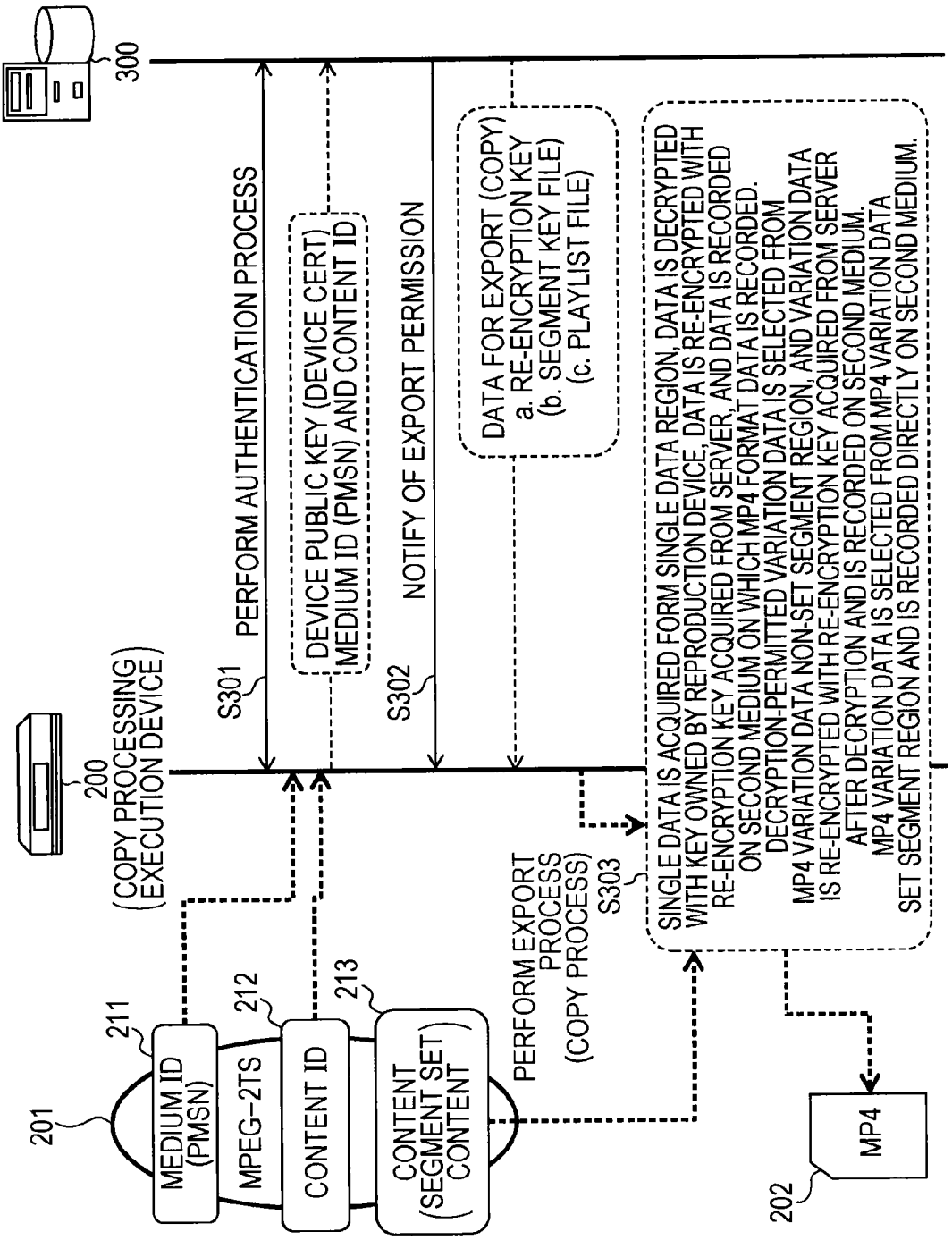
FIG. 16 is a sequence diagram for describing a sequence of a data recording process involving format conversion according to an embodiment of the present disclosure.

FIG. 16 is a sequence diagram for describing a sequence of a data recording process involving the format conversion.

An information processing device 200 illustrated in FIG. 16 performs the format conversion from the MPEG-2 TS format to the MP4 format.

In a first medium 201, content 213 with the MPEG-2 TS format having the setting of the variation data described with reference to FIG. 13A is stored.

That is, the content 213 is content in which the MP4 variation data are set in only some segment regions among the plurality of pieces of segment regions.

The first medium 201 is, for example, a BD (Blu-ray (registered trademark) Disc).

In the first medium 201, a medium ID 211 which is an identifier unique to a medium and a content ID 212 which is an identifier of the content are stored in addition to the content 213. The medium ID 211 is, for example, a PMSN (Prerecordede Media Serial Number) which is recorded through a physical recording process and is difficult to be rewritten on a medium (disc).

The information processing device 200 reads the content 213 recorded in conformity with the MPEG-2 TS format from the first medium 201, performs the format conversion to generate the MP4 format data, and records the MP4 format data on the second medium 202.

The second medium 202 includes, for example, a flash memory such as an SD card.

The information processing device 200 mounts two media, i.e., the first medium 201 and the second medium 202, performs the format conversion on the content 213 read from the first medium 201, and records the MP4 format data generated through the format conversion on the second medium 202.

Hereinafter, processes of steps will be sequentially described.

(Step S301)

The information processing device 200 mounting the first medium 201 and the second medium 202 first performs an authentication process with a copy management server 300 in step S301.

The copy management server 300 is a server that manages content recorded on the first medium 201. The information processing device 200 can record (copy) the data (content) 213 recorded on the first medium 201 on another medium under the condition that an export permission notification serving as copy permission information from the copy management server 300 is received.

In step S301, the information processing device 200 performs the authentication process with the copy management server 300.

For example, mutual authentication is performed in conformity with a public key encryption scheme.

The information processing device 200 transmits a public key certificate (Device Cert) stored in a memory of the self-information processing device 200 to the copy management server 300.

The copy management server 300 also supplies a public key certificate (Server Cert) of the server to the information processing device 200.

Through the process involving the exchange of the public key certificates, the mutual authentication process of confirming legitimacy of both of the device and the server is performed.

When the mutual authentication process is performed or after the mutual authentication process is established, the information processing device 200 transmits the medium ID 211 read from the mounted first medium 201 or the content ID 212 to the copy management server 300.

The medium ID or the content ID is used as data for specifying the copy target content 213 stored in the first medium 201.

The copy management server 300 specifies the copy target content based on the medium ID 211 or the content ID 212 and determines whether to perform copy permission.

When the mutual authentication process of step S301 is established and the legitimacy of both of the devices is confirmed, the process proceeds to step S302.

When the mutual authentication is not established, the process of step S302 is not performed. That is, the information processing device 200 does not receive the export permission (copy permission) notification from the copy management server 300 and may not perform the content copy process.

(Step S302)

When the mutual authentication process of step S301 is established and the legitimacy of both of the devices is confirmed, the process proceeds to step S302.

In step S302, the copy management server 300 notifies the information processing device 200 of the export permission (copy permission). That is, permission information permitting the content recorded on the first medium 201 to be recorded on the second medium 202 is notified of.

When the export permission (copy permission) notification process in step S302 is performed, the copy management server 300 transmits the following key to the information processing device 200:

a. a re-encryption key.

The re-encryption key is a key used to encrypt the content including the MP4 format data stored in the second medium 202.

The information processing device 200 records, on the second medium 202, encrypted content generated by decrypting the content 201 read from the first medium 201 and performing an encryption process on the decrypted content in conformity with the regulations of the MP4 format. The re-encryption key is a key that is applied to perform the encryption process in conformity with the regulations of the MP4 format.

The re-encryption key does not include a key corresponding to the MP4 variation data set in some segment regions among the plurality of segment regions.

In the variation data set structure of the second embodiment, as described with reference to FIGS. 13A and 13B, the MP4 variation data are set in only some segment regions among the plurality of segment regions.

When the information processing device 200 records the MP4 format data, the MP4 variation data is read directly, i.e., while the encrypted data remains, from the first medium 201 and is recorded on the second medium 202.

When the export permission (copy permission) notification process in step S302 is performed, the copy management server 300 transmits the re-encryption key to the information processing device 200 and transmits the following data, as necessary:

b. segment key file; and
c. playlist file.

Such data is transmitted.

The segment key file is a file that stores a key (segment key) is applied to the decryption of the variation data to be reproduced along the reproduction path of the information processing device 200.

The segment key stored in the segment key file is encrypted and the segment key used to decrypt the variation data corresponding to the reproduction path is structured to be acquirable by performing decryption with the key maintained in the information processing device 200.

The segment key file transmitted from the server 300 to the information processing device 200 is assumed to be a file formed by only the segment keys necessary to decrypt the variation data to be reproduced along the reproduction path set in the information processing device 200.

Alternatively, the segment key file may be set such that all of the segment keys applied to the decryption of all of the variation data present in all of the segment regions included in the content are included as the encrypted data. However, at the time of this setting, a segment key file is generated and transmitted which has a structure decryptable with the keys owned by the reproduction device and includes only segment keys necessary to decrypt the variation data of the reproduction target present on the reproduction path of which the information processing device 200 is notified.

The playlist file is a reproduction control information file that is used to reproduce the content 213 along the reproduction path set in the information processing device 200.

One reproduction path can correspond to one playlist.

That is, in order to reproduce content of another reproduction path, it is necessary to use another playlist.

The following files are recorded on the first medium 201 recording the content 213:

b. segment key file; and
c. playlist file.

When these pieces of data are recorded, the information processing device 200 can read the data from the first medium 201 and these pieces of data are not necessary to be transmitted from the copy management server 300.

The data supplied from the copy management server 300 to the information processing device 200 in step S302 is preferably structured to be encrypted and supplied with, for example, a session key shared through a mutual authentication process.

(Step S303)

The information processing device 200 receiving the export permission (copy permission) notification from the copy management server 300 and receiving the data such as the re-encryption key performs a data recording process involving the format conversion on the content 213 recorded on the first medium 201 using the received data or the data recorded on the first medium 201.

The content 213 which is a format conversion target has the data structure described with reference to FIG. 13A. That is, the content includes the following two regions:

(a) single data region having single data reproduced commonly by all of the reproduction devices; and
(b) segment regions.

The segment regions are divided into the following segment regions:

(b1) MP4 variation data non-set segment regions in which the MP4 variation data is not set; and
(b2) MP4 variation data set segment regions in which the plurality of pieces of MP4 variation data is set.

In FIG. 13A, the segments 1, 3, etc. are the (b1) MP4 variation data non-set segment regions.

In FIG. 13A, the segments 2, 4, etc. are the (b2) MP4 variation data set segment regions.

The information processing device 200 performs the following processes on each of the (a) the single data region, (b1) the MP4 variation data non-set segment region, (c) the MP4 variation data set segment region.

(a) For the single data region, the single data is acquired from the single data region, the single data is decrypted with the key owned by the reproduction device, the decrypted data is re-encrypted with the key acquired from the server, and the re-encrypted data is recorded on the second medium on which the MP4 format data is recorded.

(b) For the MP4 variation data non-set segment region, the single data set in the MP4 variation data non-set segment region is acquired, the acquired data is decrypted with the key owned by the reproduction device or the key (segment key) acquired from the server, and the decrypted data is re-encrypted with the re-encryption key acquired from the server, and the re-encrypted data is recorded on the second medium on which the MP4 format data is recorded.

(c) For the MP4 variation data set segment region, all of the MP4 variation data are selected and are recorded directly on the second medium.

(c) Since the MP4 variation data recorded in the MP4 variation data set segment region is recorded as the encrypted data corresponding to the MP4 format from the beginning, a process of recording the MP4 variation data on the second medium 202 while the encrypted data remains is performed without performing the decryption process and the re-encryption process.

Through such a process, the MP4 format data is generated and recorded on the second medium 202.

Here, the process of converting only the reproduction target data has been described. However, for other reproduction control information or the like, the information processing device 200 also performs a process of converting data recorded on the first medium 201 into MP4 format data and recording the MP4 format data.

Next, a process sequence when the MP4 format data recorded on the second medium 202 is reproduced in the sequence described with reference to FIG. 16 will be described with reference to FIG. 17.

Figure 17:
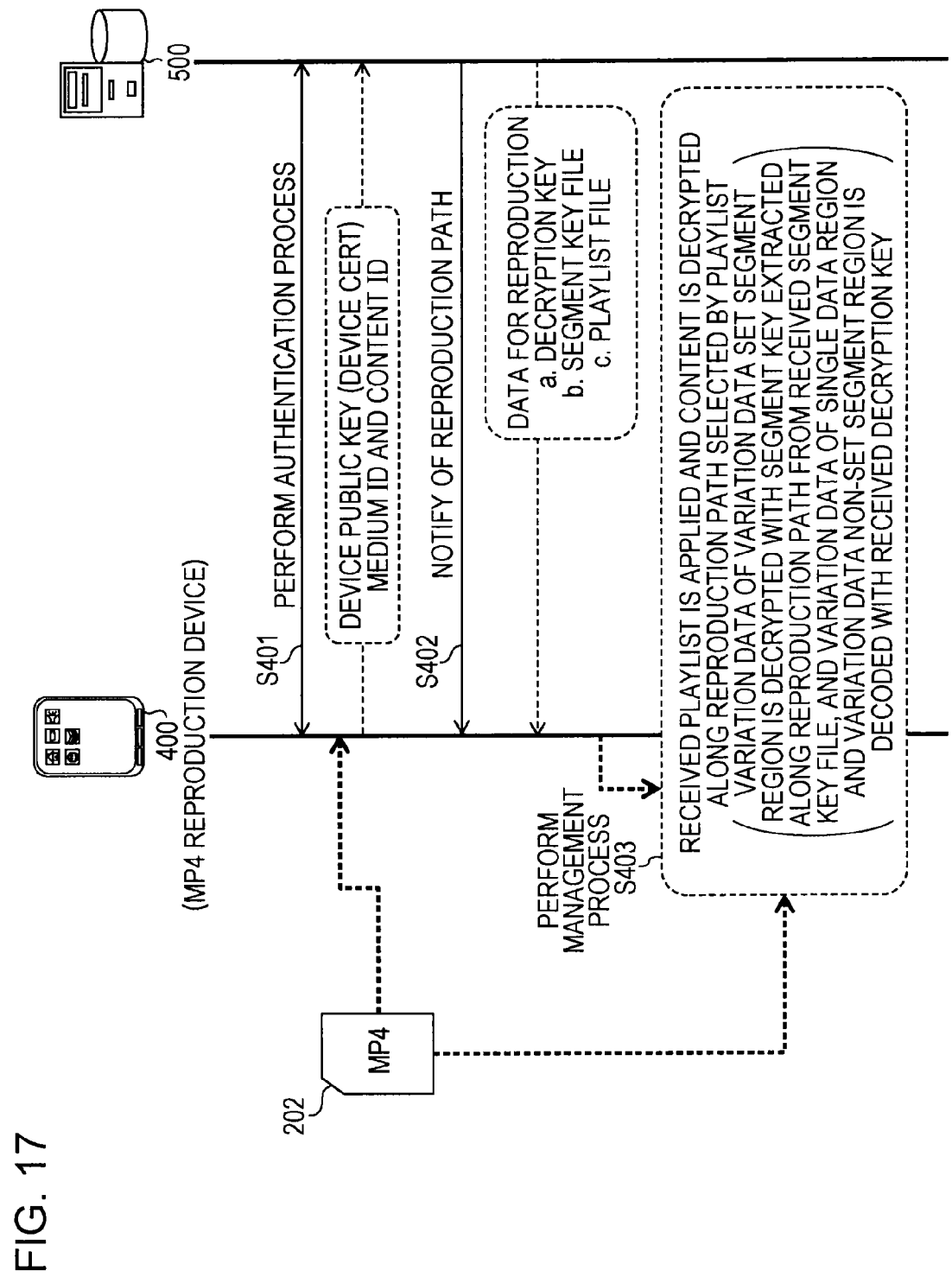
FIG. 17 is a sequence diagram for describing a reproduction sequence of MP4 format data generated through a data recording process involving format conversion according to an embodiment of the present disclosure.

FIG. 17 illustrates the second medium 202 that stores the MP4 format data recorded in the sequence described with reference to FIG. 16 and an information processing device 400 which is a reproduction device that mounts the second medium 202 and performs a process of reproducing the MP4 format data.

Further, an MP4 content management server 500 is illustrated which performs communication with the information processing device 400, notifies a reproduction path permitted to the information processing device 400, and performs a process of supplying data necessary for reproduction.

The reproduction target content stored in the second medium 202 is the MP4 format data. The content has the structure described above with reference to FIG. 13B. That is, the content includes the segment region including the plurality of pieces of variation data decryptable with different keys (segment keys).

On the second medium 202, a content ID which is a content identifier is recorded in addition to the content. The content ID is a content ID that is read from the first medium 201 when the content copy process described with reference to FIG. 16 is performed.

A medium ID which is identification information of the second medium 202 is recorded on the second medium 202.

The information processing device 400 mounts the second medium 202 and reproduces the content as the MP4 format data.

In the reproduction process, a decryption key (segment key) of the variation data which is structure data of the content is necessary.

The segment key is not recorded on the second medium 202 and is supplied from the MP4 content management server 500.

Hereinafter, processes of steps of the sequence diagram illustrated in FIG. 17 will be sequentially described.

(Step S401)

The information processing device 400 mounting the second medium 202 first performs an authentication process with the MP4 content management server 500 in step S401.

For example, mutual authentication is performed in conformity with a public key encryption scheme.

The information processing device 400 transmits a public key certificate (Device Cert) stored in a memory of the self-information processing device 200 to the MP4 content management server 500.

The MP4 content management server 500 also supplies a public key certificate (Server Cert) of the server to the information processing device 400.

Through the process involving the exchange of the public key certificates, the mutual authentication process of confirming legitimacy of both of the device and the server is performed.

When the mutual authentication process is performed or after the mutual authentication process is established, the information processing device 400 transmits the medium ID read from the mounted second medium 202 or the content ID to the MP4 content management server 500.

The medium ID or the content ID is used as data for specifying the content stored in the second medium 202.

The MP4 content management server 500 specifies the reproduction target content based on the medium ID or the content ID and transmits the following data to be applied to the reproduction to the information processing device 400:

a. decryption key;
b. segment key file; and
c. playlist file.

Such data is supplied to the information processing device 400.

When the mutual authentication process of step S401 is established and the legitimacy of both of the devices is confirmed, the process proceeds to step S402.

When the mutual authentication is not established, the process of step S402 is not performed. That is, the information processing device 400 does not receive the decryption key, the segment key file, and the playlist file from the server and may not perform the content reproduction.

(Step S402)

When the mutual authentication process of step S401 is established and the legitimacy of both of the devices is confirmed, the process proceeds to step S402.

In step S402, the MP4 content management server 500 notifies the information processing device 400 of the reproduction path. That is, this reproduction path is, for example, the reproduction path described above with reference to FIGS. 11 and 12 and the like.

The individual identifier of the reproduction path, e.g., a reproduction path number, is set in the reproduction path. Then, the MP4 content management server 500 notifies the information processing device 400 of the reproduction path number.

With the notification of the reproduction path, the MP4 content management server 500 the following data to the information processing device 400:

a. decryption key;
b. segment key file; and
c. playlist file.

Such data is transmitted to the information processing device 400.

The a. decryption key is, for example, a key that is applied to decrypt the encrypted data of the following data region in the content structure data:

(a) single data region.

The b. segment key file is a file in which a segment key necessary to decrypt the variation data set in the following segment regions of the content is stored:

(b1) MP4 variation data non-set segment region; and
(b2) MP4 variation data set segment region.

Here, the variation data set in the following region is one piece of variation data and all of the reproduction devices reproduce one piece of common data:

(b1) MP4 variation data non-set segment region.

Accordingly, the segment key applied to the data decryption of the following region is supplied commonly to all of the reproduction devices (MP4 reproduction devices):

(b1) MP4 variation data non-set segment region.

The segment key applied to the data decryption of the (b1) MP4 variation data non-set segment region may be structured not to be included in the segment key file, to be included in the decryption key corresponding to the foregoing single data region, and to be supplied to all of the reproduction devices.

The segment key which the information processing device 400 can acquire from the segment key file is only the segment key applied to the description of the variation data selected along the reproduction path of which the information processing device 400 is notified.

The reproduction path is determined, for example, according to the information processing device (reproduction device), as described above with reference to FIGS. 11A and 11B.

The MP4 content management server 500 notifies the information processing device 400 of the reproduction path permitted to the information processing device 400, and generates and supplies the segment key file for which the segment key applied to the decryption of the variation data of each segment region reproduced along the notified reproduction path can be acquired by the information processing device 400.

The segment key stored in the segment key file is encrypted, and thus the segment key may be structured to be acquired through decryption with the key maintained in the information processing device 400.

The segment key file transmitted from the MP4 content management server 500 to the information processing device 400 is assumed to be a file formed by only the segment keys necessary to decrypt the variation data to be reproduced along the reproduction path of which the information processing device 400 is notified.

Alternatively, the segment key file may be set such that all of the segment keys applied to the decryption of all of the variation data present in all of the segment regions included in the content are included as the encrypted data. However, at the time of this setting, a segment key file is generated and transmitted which has a structure decryptable with the keys owned by the information processing device 400 and includes only segment keys necessary to decrypt the variation data of the reproduction target present on the reproduction path of which the information processing device 400 is notified.

The c. the playlist file is reproduction control information used to reproduce the content along the reproduction path of which the MP4 content management server 500 notifies the information processing device 400.

One reproduction path can correspond to one playlist.

That is, in order to reproduce content of another reproduction path, it is necessary to use another playlist.

In the example illustrated in the drawing, the MP4 content management server 500 notifies the information processing device 400 of one reproduction path is in step S402, and the playlist used to reproduce the content along the notified reproduction path is supplied from the MP4 content management server 500 to the information processing device 400.

The data supplied from the MP4 content management server 500 to the information processing device 400 is preferably structured to be encrypted and supplied with, for example, a session key shared in the mutual authentication process.

(Step S403)

The information processing device 400 receives a notification of the reproduction path from MP4 content management server 500, and the information processing device 400 receiving each of the following data decrypts the content in conformity with the MP4 format stored in the second medium 202 using the received data and performs the reproduction process:

a. decryption key;
b. segment key file storing the segment key to be applied to the decryption of the variation data set in the notified reproduction path; and
c. playlist file which is reproduction control information used to reproduce the content according to the notified reproduction path.

The content stored in the second medium 202 is the MP4 format data and includes the following regions, as described above with reference to FIG. 13B:

(a) single data region;
(b1) MP4 variation data non-set segment region; and
(b2) MP4 variation data set segment region.

The segment key file is a file in which a segment key necessary to decrypt the variation data set in the (b2) MP4 variation data set segment region is stored.

When the content is reproduced, the content is reproduced according to the playlist in which the reproduction control information used to reproduce the content along the reproduction path of the reproduction target content is recorded.

In "the MP4 variation data set segment region" of the content, the plurality of pieces of variation data decryptable with different keys are set.

The information processing device 400 decrypts and reproduces one piece of variation data selected from the "MP4 variation data set segment region" using, for example, the segment key decrypted to be obtainable by applying the key stored in the memory of the self-information processing device from the segment key file received from the MP4 content management server 500.

One reproduction path is automatically selected through the reproduction process in which the playlist received from the MP4 content management server 500 is applied, and one piece of variation data is sequentially selected from each segment region. The information processing device 400 decrypts the selected variation data with the segment key corresponding to the variation data acquired from the segment key file and performs the reproduction.

Variation data identification information (Forensic Mark) indicating certain variation data is embedded in the variation data such as an image obtained through this decryption process.

This variation data identification information is the variation data identification information (Forensic Mark) described above with reference to FIG. 12.

For example, when illegal circulated content is detected, it is possible to perform source tracking based on the variation data identification information (Forensic Mark).

[5. Example of Configuration of Information Processing Device Performing Format Conversion and Data Recording Process]

Next, an example of the configuration of a device performing the processes according to the above-described embodiments will be described with reference to FIG. 18 and the subsequent drawings.

Figure 18:
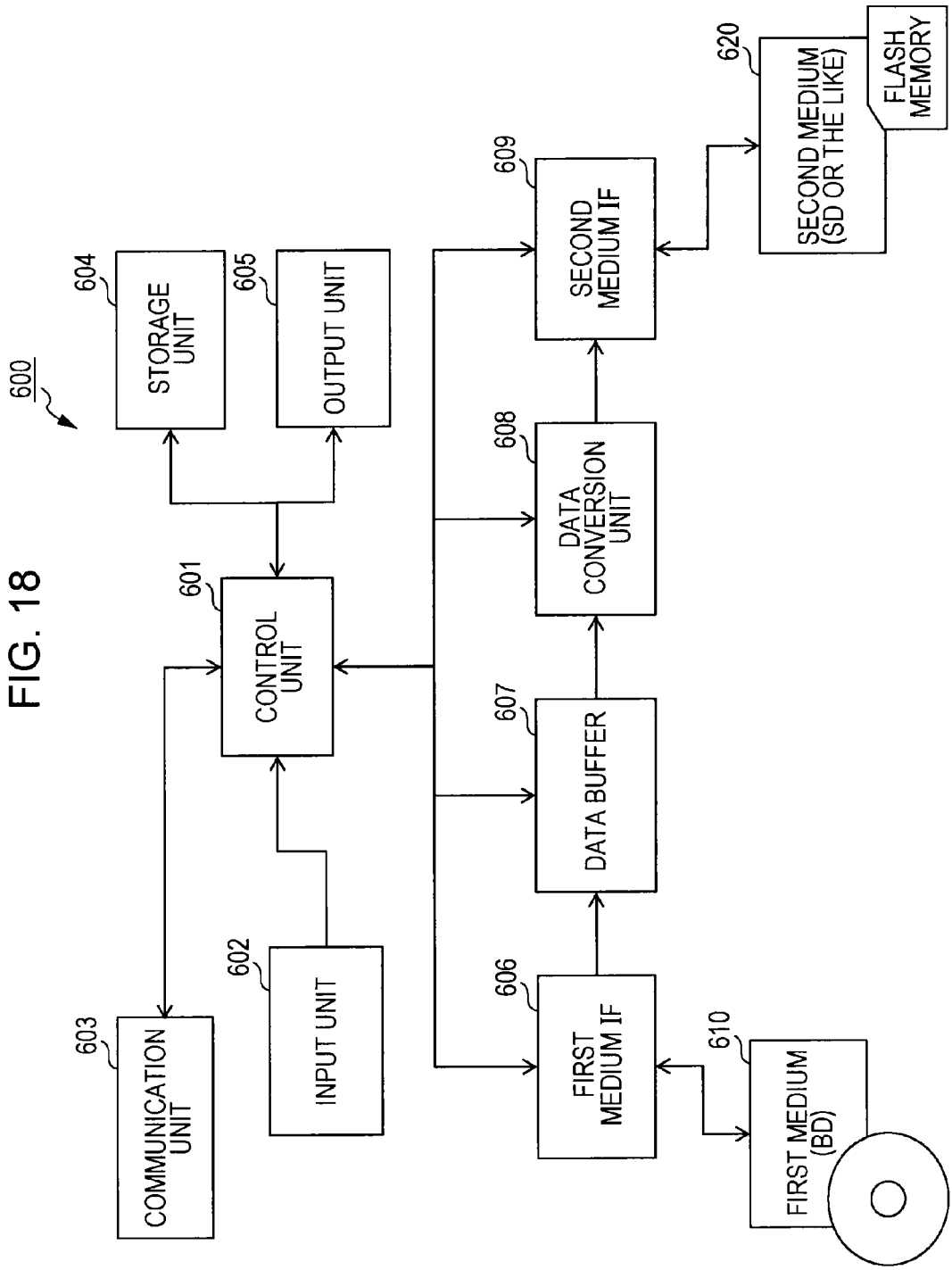
FIG. 18 is a diagram for describing an example of the configuration of an information processing device.

An information processing device 600 illustrated in FIG. 18 is an information processing device that records, on a second medium 620, the MP4 format data generated by converting the MPEG-2 TS format data recorded on a first medium 610.

The information processing device 600 performs a so-called copy process of reading data recorded on the first medium 610 which is, for example, an information recording medium such as a BD (Blu-ray (registered trademark) Disc) and recording the data on the second medium 620 which is an information recording medium such as a flash memory.

Alternatively, a process of recording data input via a communication unit 603 on the second medium 620 such as a flash memory is performed.

A data format of the data input via the first medium 610 or the communication unit 603 is assumed to be a first format and the format of the data recorded on the second medium 620 is assumed to be a second format.

When the information processing device records data with the first format input via the first medium 610 or the communication unit 603 on the second medium 620 such as a flash memory, the information processing device performs a process of converting first format data into second format data.

In the above-described embodiments, the format of the data input via the first medium 610 or the communication unit 603 is the MPEG-2 TS format and the recording format of the second medium is the MP4 format.

When the information processing device 600 records data on the second medium 620, the information processing device 600 performs format conversion from the MPEG-2 TS format to the MP4 format.

As illustrated in FIG. 18, the information processing device 600 includes a control unit 601, an input unit 602, the communication unit 603, a storage unit 604, an output unit 605, a first medium IF (interface) 606, a data buffer 607, a data conversion unit 608, and a second medium IF 609.

The control unit 601 controls data processing, such as data recording and reproducing using a medium and a data copy process between media, performed in the information processing device 600. For example, such control is performed according to a program stored in the storage unit 604.

The input unit 602 is an input unit such as a switch, a button, or a touch panel which a user can operate and is an input unit that performs an instruction input of various processes such as reproduction, copy, and recording.

The input unit 602 may be configured to include an imaging unit and a microphone that inputs an image, audio, and the like to be recorded on a medium.

The communication unit 603 performs communication with, for example, an external server or an external device and is used to perform various communication processes such as acquisition of data recorded on a medium, control information regarding recorded data, or permission information of a copy process.

The storage unit 604 is used for a storage region of a program executed by the control unit 601 or a parameter used in execution of a program and a work region or the like at the time of execution of a program.

Specifically, the storage unit is also used for a region temporarily storing data read from the first medium 610 or data input via the communication unit 603 at the time of recording of data on the second medium 620.

The storage unit 604 is configured as, for example, a RAM, a ROM, or the like.

The output unit 605 is configured as an output unit for an external device or an output unit of reproduced data from a medium. For example, the output unit is used for indication of a progress status of a data recording process on the second medium 620, indication of a message for a user, or the like and includes a display or a speaker.

The first medium interface (IF) 606 is an interface that accesses the first medium 610, e.g., a BD (Blu-ray (registered trademark) Disc) and functions as a data recording and reproducing unit performing data recording or data reading on the first medium 610.

The data buffer 607 is a buffer that temporarily stores data read from the first medium 610 or data input from the communication unit 603. For example, data recorded on the second medium 620 is temporarily stored.

The data conversion unit 608 performs a format conversion process of converting the first format of the data which is the format of data recorded on the first medium 610 or data input via the communication unit 603 into the second format which is the format of data when the data is recorded on the second medium 620 which is a data recording destination.

The second medium interface (IF) 609 is an interface that accesses the second medium 620 and functions as a data recording and reproducing unit performing a process of recording or reading data on or from the second medium 620.

In this way, the information processing device 600 performs a process of recording the data with the first format input via the first medium 610 and the communication unit 603 on the second medium 620 such as a flash memory. When this process is performed, a process of converting first format data into second format data is performed.

The first format is, for example, MPEG-2 TS format data and the second format is, for example, MP4 format data.

The information processing device 600 may perform a process of acquiring data, which may not be acquired from the first medium 610, from an external server via the communication unit 603 and recording data read from the first medium 610 and received data acquired via the communication unit 603 on the second medium 620 together.

In the configuration illustrated in FIG. 18, the first medium 610 is, for example, a BD (Blu-ray (registered trademark) Disc). The second medium 620 is, for example, a flash memory such as an SD card.

The first medium 610 and the second medium 620 are not limited to the foregoing combination, but various combinations can be achieved.

Next, the detailed configuration of the data conversion unit 608 will be described with reference to FIG. 19.

Figure 19:
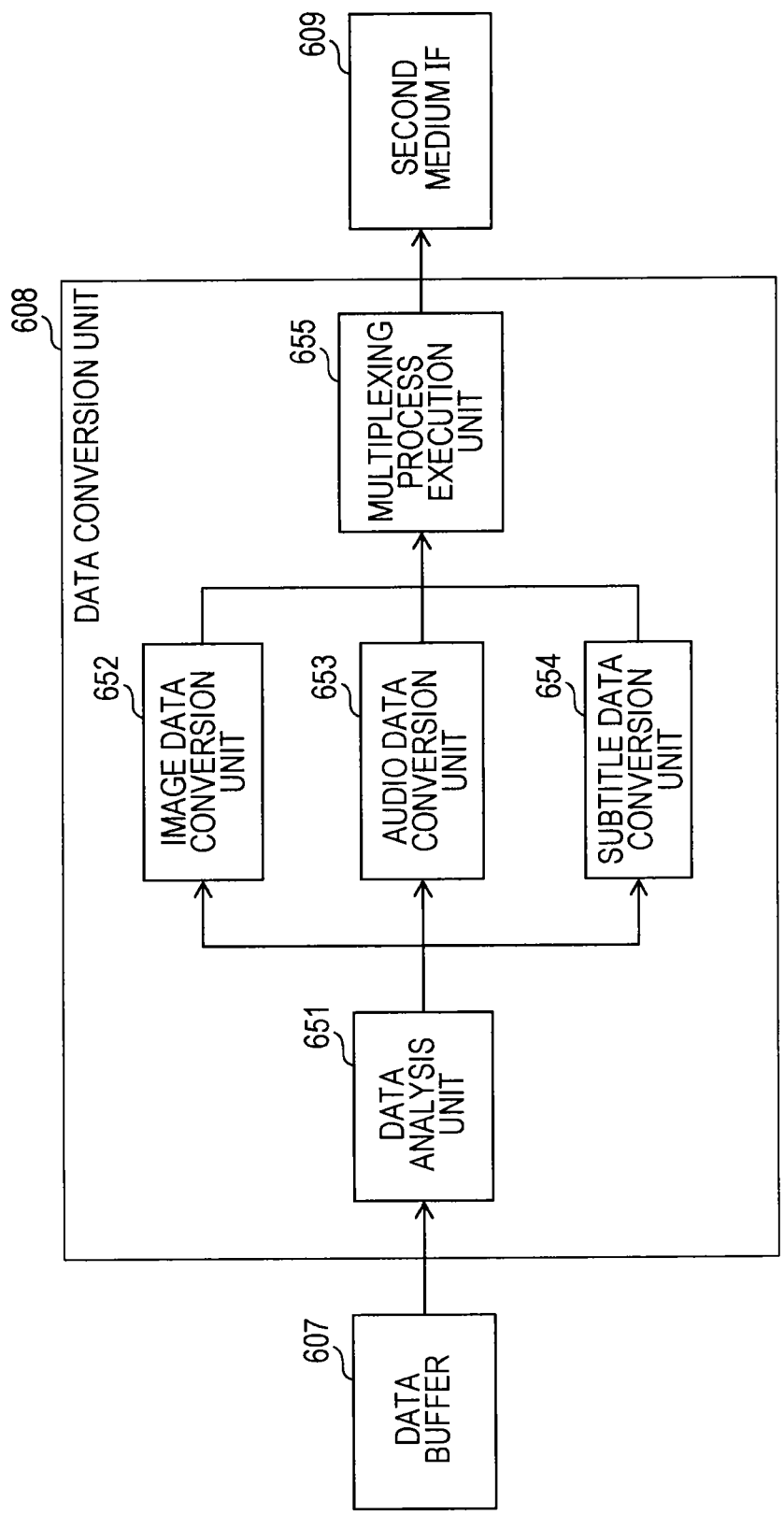
FIG. 19 is a diagram for describing an example of the configuration of a data conversion unit of the information processing device.

As illustrated in FIG. 19, the data conversion unit 608 includes a data analysis unit 651, an image data conversion unit 652, an audio data conversion unit 653, a subtitle data conversion unit 654, and a multiplexing process execution unit 655.

Based on an identifier (PID: a program ID) set in data stored in the data buffer 607 and read from the first medium 610 or data (packet) input via the communication unit 603, the data analysis unit 651 classifies each piece of data (packet) into the following three kinds of pieces of data:

image data;
audio data; and
subtitle data.

The data analysis unit 651 outputs the image data to the image data conversion unit 652, outputs the audio data to the audio data conversion unit 653, and outputs the subtitle data to the subtitle data conversion unit 654.

The image data conversion unit 652, the audio data conversion unit 653, and the subtitle data conversion unit 654 perform a process of converting the first format which is the data format of input data, e.g., MPEG-2 TS format data into the second format with which data is recorded on the second medium 620, specifically e.g., format data of the MP4 format.

That is, the image data conversion unit 652 generates the image data of the MP4 format which is the data recording format for the second medium 620 and outputs the image data to the multiplexing process execution unit 655.

The audio data conversion unit 653 generates audio data with the MP4 format and output the audio data to the multiplexing process execution unit 655.

The subtitle data conversion unit 654 generates subtitle data with the MP4 format and outputs the subtitle data to the multiplexing process execution unit 655.

The multiplexing process execution unit 655 performs a multiplexing process on each piece of the following data to generate recorded data with the second format (MP4):
  (a) image format data with the second format (MP4) generated by the image data generation unit 652;
  (b) audio format data with the second format (MP4) generated by the audio data generation unit 653;
  (c) subtitle format data with the second format (MP4) generated by the subtitle data generation unit 654; and
  (d) data extracted from, for example, a reproduction control information file stored in the storage unit 604.

The date generated by the multiplexing process execution unit 655 is recorded on the second medium 620 via the second medium interface 609.

In this way, the information processing device 600 performs a process of converting data recorded on the first medium 610 or data with the first format (MPEG-2 TS format) input via the communication unit 603 into data with the second format (MP4) which is the recording format of the second medium 620 and recording the converted data on the second medium 620.

The data conversion unit 608 performs the format conversion on the MPEG-2 TS format data having the setting of the variation data according to each of the following embodiments described above to generate the MP4 format data:
  (the first embodiment) the embodiment in which the variation data is set, as described with reference to FIGS. 10A to 12 and 14; and
  (the second embodiment) the embodiment in which the variation data is set, as described with reference to FIGS. 13A, 13B and 16.

The set structure of the variation data in each embodiment is as follows:
  (the first embodiment) the structure in which the MPEG-2 TS variation data and the MP4 variation data are set in each segment region; and
  (the second embodiment) the structure in which the MP4 variation data is set only in some segment regions among the plurality of segment regions.

For example, the image data conversion unit 652 inputs TS packets corresponding to the image data detected based on the PID by the data analysis unit 651 and performs the format conversion process on the image data having the variation data extracted from the TS packets according to the above-described embodiments.

[6. Example of Configurations of Information Processing Device and Server Performing Data Reproducing and Recording Processes]

Figure 20:
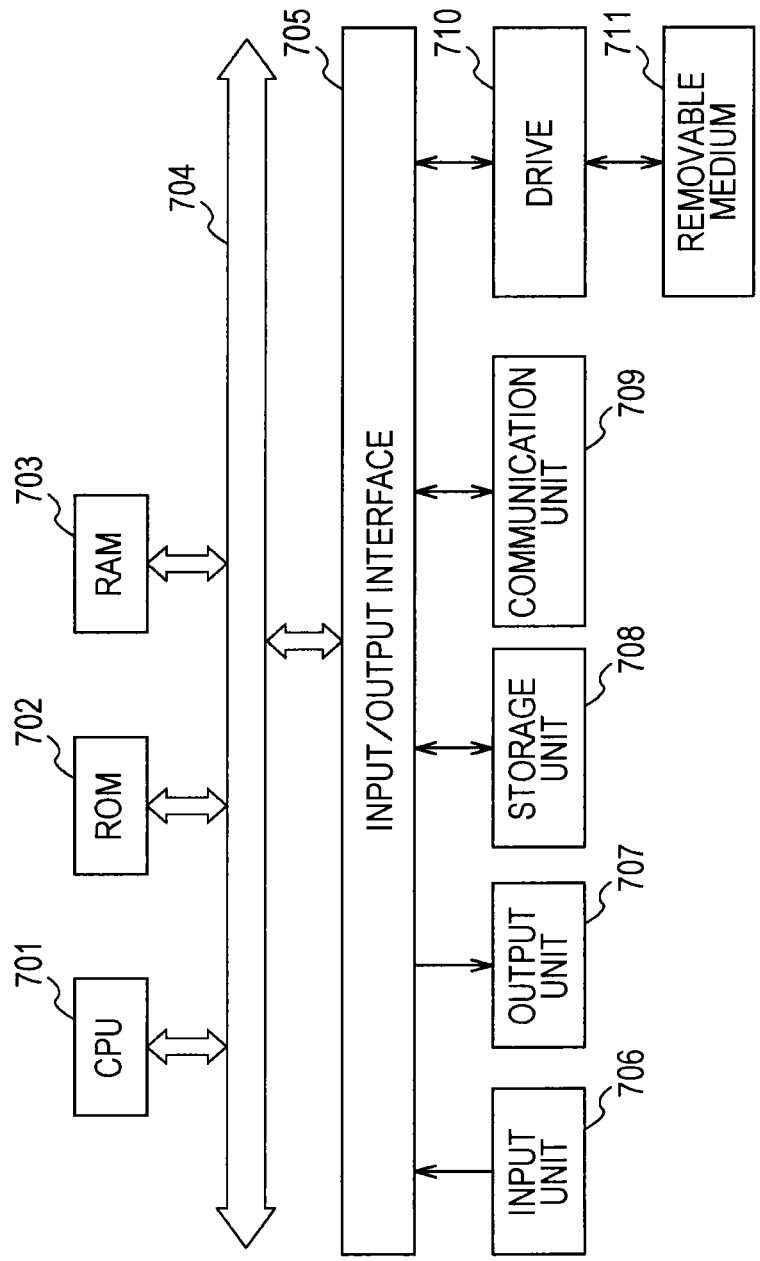
FIG. 20 is a diagram for describing an example of a hardware configuration of the information processing device.

Next, an example of a hardware configuration of the information processing device performing the process of reproducing the MP4 format data in the sequences illustrated in FIGS. 15 and 17, the information processing device generating and recording the MPEG-2 TS format data on a medium, and the information processing device applicable as the server performing the process described with reference to the sequence diagrams of FIGS. 14 to 17 will be described with reference to FIG. 20.

A CPU (Central Processing Unit) 701 functions as a data processing unit that performs various processes according to a program stored in a ROM (Read-Only Memory) 702 or a storage unit 708. For example, the process is performed according to the sequences described in the above-described embodiments. The RAM (Random Access Memory) 703 stores a program executed by the CPU 701, data, and the like. The CPU 701, the ROM 702, and the RAM 703 are connected to each other by a bus 704.

The CPU 701 is connected to an input/output interface 705 via the bus 704. An input unit 706 formed from various switches, a keyboard, a mouse, a microphone, or the like and an output unit 707 formed from a display, a speaker, or the like are connected to the input/output interface 705. The CPU 701 performs various processes in response to instructions input from the input unit 706 and outputs processing results to, for example, the output unit 707.

The storage unit 708 connected to the input/output interface 705 is formed from, for example, a hard disk and stores a program executed by the PU 701 and various kinds of data. The communication unit 709 functions as a transmission and reception unit of data communication via a network such as the Internet or a local area network and a transmission and reception unit of broadcast waves, and communicates with an external device.

A drive 710 connected to the input/output interface 705 drives a removable medium 711 such as a magnetic disk, an optical disc, a magneto-optical disc, or a semiconductor memory such as a memory card, and records or reads data.

Encoding or decoding of data can be executed as processes of the CPU 701 serving as a data processing unit. However, a codec may be configured to be included as dedicated hardware that executes an encoding process or a decoding process.

[7. Conclusion of Configurations of the Present Disclosure]

The embodiments of the present disclosure have been described in detail with reference to the specific embodiments. However, it should be apparent to those skilled in the art that corrections or substitutions of the embodiments can be made within the scope of the present disclosure without departing from the gist of the present disclosure. That is, since the present disclosure has been disclosed as exemplary forms, the present disclosure has not to be construed as limiting. To determine the gist of the present disclosure, the claims should be referred to.

The description disclosed in the present specification can be taken as follows:
  (1) An information processing device includes a data processing unit that performs format conversion of converting MPEG-2 TS format data into MP4 format data. The MPEG-2 TS format data is data that includes each segment region having a plurality of pieces of variation data decryptable with different keys. The data processing unit selects encrypted MP4 variation data from the segment region of the MPEG-2 TS format data and stores the MP4 variation data as MP4 format structure data in an MP4 file, while the encrypted variation data remains, without performing a decryption process and a re-encryption process for the selected MP4 variation data.

(2) In the information processing device described in (1), each of the pieces of variation data set in the segment region of the MPEG-2 TS format data may be data in which a variation identifier is embedded and may be data for which the variation identifier is extractable from decrypted data.

(3) In the information processing device described in (1) or (2), the segment region of the MEPG-2 TS format data may be a data region in which one piece of variation data is selected and reproduced along a reproduction path permitted to a reproduction device.

(4) In the information processing device described in any one of (1) to (3), the MP4 format data may be data in conformity with a CFF (Common File Format).

(5) In the information processing device described in any one of (1) to (4), MPEG-2 TS variation data and MP4 variation data may be set in each segment region of the MPEG-2 TS format data. The data processing unit may select only the MP4 variation data from each segment region of the MPEG-2 TS format data and store the selected MP4 variation data as the MP4 format structure data in the MP4 file.

(6) In the information processing device described in any one of (1) to (5), the MPEG-2 TS format data may have the segment regions of different modes:

(1) an MP4 variation data non-set segment region in which no MP4 variation data is set are set; and (2) an MP4 variation data set segment region in which the plurality of pieces of MP4 variation data is set are set.

The data processing unit may select only the MP4 variation data from the MP4 variation data set segment region and store the selected MP4 variation data as the MP4 format structure data in the MP4 file.

(7) In the information processing device described in (6), the data processing unit may select one piece of decryptable variation data in the MP4 variation data non-set segment region and store the selected variation data as the MP4 format structure data in the MP4 file.

(8) In the information processing device described in (7), the one piece of decryptable variation data may be the variation data selected as reproduction target data along a reproduction path set to correspond to the information processing device.

(9) The information processing device described in any one of (1) to (8) may further include a communication unit that receives copy permission notification from a server. Under a condition that the copy permission notification is received, the data processing unit may convert the MPEG-2 TS format data stored in a first medium into the MP4 format data and record the MP4 format data on a second medium.

(10) In the information processing device described in (9), the data processing unit may decrypt at least some of the data among the MPEG-2 TS format data excluding the MP4 variation data, perform a re-encryption process by applying a re-encryption key received from the server, and store the re-encrypted data in the MP4 file.

(11) An information recording medium stores MPEG-2 TS format data. The MPEG-2 TS format data is data that includes each segment region having a plurality of pieces of variation data decryptable with different keys. The variation data set in the segment region includes MPEG-2 TS variation data and MP4 variation data. A conversion device reading the MPEG-2 TS format data recorded on the information recording medium and converting the MPEG-2 TS format data into the MP4 format data is able to store the MP4 variation data as MP4 format structure data in an MP4 file, while the encrypted variation data remains, without performing a decryption process and a re-encryption process for the MP4 variation data.

(12) An information processing device includes a data processing unit that performs a process of reproducing MP4 format data and a communication unit that performs communication with a server. The MP4 format data is data which includes a segment region having a plurality of pieces of variation data decryptable with different keys and in which a plurality of reproduction paths is settable according to the variation data selected as reproduction targets. Each piece of variation data is data for which a variation data identifier is able to be analyzed from decrypted data. The communication unit receives reproduction path information permitted to be reproduced from the server. The data processing unit selects the variation data from the segment region according to the reproduction path information received from the server and performs content reproduction.

(13) In the information processing device described in (12), the MP4 format data may be data stored in an information recording medium. The communication unit may transmit a content identifier corresponding to the MP4 format data or an identifier of the information recording medium to the server and receive the reproduction path information permitted to correspond to the MP4 format data from the server.

(14) In the information processing device described in (12) or (13), the data processing unit may acquire a segment key from a segment key file received from the server and decrypt the variation data by applying the acquired segment key.

(15) An information processing method is performed in an information processing device. The information processing device includes a data processing unit that performs format conversion of converting MPEG-2 TS format data into MP4 format data. The MPEG-2 TS format data is data that includes a segment region having a plurality of pieces of variation data decryptable with different keys. The data processing unit selects encrypted MP4 variation data from the segment region of the MPEG-2 TS format data and stores the MP4 variation data as MP4 format structure data in an MP4 file, while the encrypted variation data remains, without performing a decryption process and a re-encryption process for the selected MP4 variation data.

(16) An information processing method is performed in an information processing device. The information processing device includes a data processing unit that performs a process of reproducing MP4 format data and a communication unit that performs communication with a server. The MP4 format data is data which includes a segment region having a plurality of pieces of variation data decryptable with different keys and in which a plurality of reproduction paths is settable according to the variation data selected as reproduction targets. Each piece of variation data is data for which a variation data identifier is able to be analyzed from decrypted data. The data processing unit selects the variation data from the segment region according to the reproduction path information received from the server and performs content reproduction.

(17) A program causes an information processing device to perform information processing. The information processing device includes a data processing unit that performs format conversion of converting MPEG-2 TS format data into MP4 format data. The MPEG-2 TS format data is data that includes a segment region having a plurality of pieces of variation data decryptable with different keys. The program causes the data processing unit to perform a process of selecting encrypted MP4 variation data from the segment region of the MPEG-2 TS format data and a process of storing the MP4 variation data as MP4 format structure data in an MP4 file, while the encrypted variation data remains, without performing a decryption process and a re-encryption process for the selected MP4 variation data.

(18) A program causes an information processing device to perform information processing. The information processing device includes a data processing unit that performs a process of reproducing MP4 format data and a communication unit that performs communication with a server. The MP4 format data is data which includes a segment region having a plurality of pieces of variation data decryptable with different keys and in which a plurality of reproduction paths is settable according to the variation data selected as reproduction targets. Each piece of variation data is data for which a variation data identifier is able to be analyzed from decrypted data. The program causes the data processing unit to select the variation data from the segment region according to the reproduction path information received from the server and perform content reproduction.

The series of processes described in the present specification can be executed by hardware, software, or a combination structure of both of the hardware and the software. When the processes are executed by software, a program recording the process sequence can be installed and executed on a memory embedded in dedicated hardware inside a computer or the problem can be installed and executed on a general computer capable of executing various processes. For example, the program can be recorded in advance on a recording medium. Not only is the program installed on a computer from a recording medium, but the program can also be received via a network a LAN (Local Area Network) or the Internet and installed to a recording medium such as an internal hard disk.

The various processes described in the present specification may be executed chronologically according to the description and may also be executed in parallel or individually according to the processing capability of a device performing the processes or as necessary. A system in the present specification has a logical collection configuration of a plurality of devices and the devices having respective configurations may not be present in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    circuitry configured to perform format conversion of converting MPEG-2 TS format data into MP4 format data, wherein the MPEG-2 TS format data is data that includes each segment region having a plurality of pieces of variation data decryptable with different keys,
    wherein the circuitry is configured to select encrypted MP4 variation data from the segment region of the MPEG-2 TS format data and store the MP4 variation data as MP4 format structure data in an MP4 file, while the encrypted variation data remains, without performing a decryption process and a re-encryption process for the selected MP4 variation data,
    wherein each of the pieces of variation data set in the segment region of the MPEG-2 TS format data is data in which a variation identifier is embedded and is data for which the variation identifier is extractable from decrypted data, and
    wherein the segment region of the MEPG-2 TS format data is a data region in which one piece of variation data is selected and reproduced along a reproduction path permitted to a reproduction device.

2. The information processing device according to claim 1, wherein the MP4 format data is data in conformity with a CFF (Common File Format).

3. The information processing device according to claim 1,
    wherein MPEG-2 TS variation data and MP4 variation data are set in each segment region of the MPEG-2 TS format data, and
    wherein the circuitry is configured to select only the MP4 variation data from each segment region of the MPEG-2 TS format data and store the selected MP4 variation data as the MP4 format structure data in the MP4 file.

4. The information processing device according to claim 1, wherein the MPEG-2 TS format data has the segment regions of different modes:
    (1) an MP4 variation data non-set segment region in which no MP4 variation data is set are set; and
    (2) an MP4 variation data set segment region in which the plurality of pieces of MP4 variation data is set are set, and
    wherein the circuitry is configured to select only the MP4 variation data from the MP4 variation data set segment region and store the selected MP4 variation data as the MP4 format structure data in the MP4 file.

5. The information processing device according to claim 4, wherein the circuitry is configured to select one piece of decryptable variation data in the MP4 variation data non-set segment region and store the selected variation data as the MP4 format structure data in the MP4 file.

6. The information processing device according to claim 5, wherein the one piece of decryptable variation data is the variation data selected as reproduction target data along a reproduction path set to correspond to the information processing device.

7. The information processing device according to claim 1, wherein the circuitry is further configured to receive copy permission notification from a server,
    wherein under a condition that the copy permission notification is received, the circuitry is configured to convert the MPEG-2 TS format data stored in a first medium into the MP4 format data and record the MP4 format data on a second medium.

8. The information processing device according to claim 7, wherein the circuitry is configured to decrypt at least some of the data among the MPEG-2 TS format data excluding the MP4 variation data, perform a re-encryption process by applying a re-encryption key received from the server, and store the re-encrypted data in the MP4 file.

9. A non-transitory information recording medium storing MPEG-2 TS format data, wherein the MPEG-2 TS format data is data that includes each segment region having a plurality of pieces of variation data decryptable with different keys, wherein the variation data set in the segment region includes MPEG-2 TS variation data and MP4 variation data, wherein a conversion device reading the MPEG-2 TS format data recorded on the information recording medium and converting the MPEG-2 TS format data into the MP4 format data is configured to store the MP4 variation data as MP4 format structure data in an MP4 file, while the encrypted variation data remains, without performing a decryption process and a re-encryption process for the MP4 variation data, wherein each of the pieces of variation data set in the segment region of the MPEG-2 TS format data is data in which a variation identifier is embedded and is data for which the variation identifier is extractable from decrypted data, and wherein the segment region of the MEPG-2 TS format data is a data region in which one piece of variation data is selected and reproduced along a reproduction path permitted to a reproduction device.

10. An information processing device comprising:

data processing means for performing format conversion of converting MPEG-2 TS format data into MP4 format data; and communication means for performing communication with a server, wherein the MPEG-2 TS format data is data that includes each segment region having a plurality of pieces of variation data decryptable with different keys, and wherein the data processing means selects encrypted MP4 variation data from the segment region of the MPEG-2 TS format data and stores the MP4 variation data as MP4 format structure data in an MP4 file, while the encrypted variation data remains, without performing a decryption process and a re-encryption process for the selected MP4 variation data, wherein each of the pieces of variation data set in the segment region of the MPEG-2 TS format data is data in which a variation identifier is embedded and is data for which the variation identifier is extractable from decrypted data, and wherein the segment region of the MEPG-2 TS format data is a data region in which one piece of variation data is selected and reproduced along a reproduction path permitted to a reproduction device.

11. An information processing method performed in an information processing device, the information processing method comprising:

performing format conversion of converting MPEG-2 TS format data into MP4 format data, the MPEG-2 TS format data being data that includes a segment region having a plurality of pieces of variation data decryptable with different keys; and selecting encrypted MP4 variation data from the segment region of the MPEG-2 TS format data and storing the MP4 variation data as MP4 format structure data in an MP4 file, while the encrypted variation data remains, without performing a decryption process and a re-encryption process for the selected MP4 variation data, wherein each of the pieces of variation data set in the segment region of the MPEG-2 TS format data is data in which a variation identifier is embedded and is data for which the variation identifier is extractable from decrypted data, and wherein the segment region of the MEPG-2 TS format data is a data region in which one piece of variation data is selected and reproduced along a reproduction path permitted to a reproduction device.

12. A non-transitory computer-readable storage medium including computer executable instructions, wherein the instructions, when executed by a computer, cause the computer to perform a method, the method comprising:

performing format conversion of converting MPEG-2 TS format data into MP4 format data, the MPEG-2 TS format data being data that includes a segment region having a plurality of pieces of variation data decryptable with different keys;

performing a process of selecting encrypted MP4 variation data from the segment region of the MPEG-2 TS format data; and performing a process of storing the MP4 variation data as MP4 format structure data in an MP4 file, while the encrypted variation data remains, without performing a decryption process and a re-encryption process for the selected MP4 variation data, wherein each of the pieces of variation data set in the segment region of the MPEG-2 TS format data is data in which a variation identifier is embedded and is data for which the variation identifier is extractable from decrypted data, and wherein the segment region of the MEPG-2 TS format data is a data region in which one piece of variation data is selected and reproduced along a reproduction path permitted to a reproduction device.

* * * * *